(12) United States Patent
Takaoka

(10) Patent No.: US 12,045,785 B2
(45) Date of Patent: Jul. 23, 2024

(54) INFORMATION PROCESSING APPARATUS, INFORMATION PROCESSING METHOD, AND NON-TRANSITORY COMPUTER-READABLE STORAGE MEDIUM

(71) Applicant: SocialGood, Inc., Tokyo (JP)

(72) Inventor: Soichiro Takaoka, Tokyo (JP)

(73) Assignee: SocialGood, Inc., Tokyo (JP)

(*) Notice: Subject to any disclaimer, the term of this patent is extended or adjusted under 35 U.S.C. 154(b) by 49 days.

(21) Appl. No.: 17/406,520

(22) Filed: Aug. 19, 2021

(65) Prior Publication Data

US 2022/0036321 A1 Feb. 3, 2022

Related U.S. Application Data

(63) Continuation of application No. PCT/JP2020/009372, filed on Mar. 5, 2020.
(Continued)

(30) Foreign Application Priority Data

Jul. 17, 2019 (JP) .................................. 2019-132200

(51) Int. Cl.
*G06Q 40/00* (2023.01)
*G06Q 20/06* (2012.01)
(Continued)

(52) U.S. Cl.
CPC .......... *G06Q 20/065* (2013.01); *G06Q 20/12* (2013.01); *G06Q 20/381* (2013.01)

(58) Field of Classification Search
CPC ..... G06Q 20/065; G06Q 20/12; G06Q 20/381
See application file for complete search history.

(56) References Cited

U.S. PATENT DOCUMENTS 11,263,543 B2 * 3/2022 Pinckney ............. G06F 16/9535
2014/0012647 A1 * 1/2014 Hecht ................... G06Q 40/04
705/37
(Continued)

FOREIGN PATENT DOCUMENTS

JP 2002-49872 A 2/2002
JP 2002-109428 A 4/2002
(Continued)

OTHER PUBLICATIONS

Aragoncillo et al: "Impulse buying behaviour: an online-offline comparative and the impact of social media", Spanish Journal of Marketing—ESIC, ISSN: 2444-9695, Article publication date: Apr. 24, 2018, Issue publication date: Jun. 5, 2018 (Year: 2018).*
(Continued)

*Primary Examiner* — Edward J Baird
(74) *Attorney, Agent, or Firm* — Bret E. Field; Bozicevic, Field & Francis LLP

(57) ABSTRACT

An information processing apparatus is provided with: an obtaining portion that obtains purchase information on a commodity or a service purchased by a user; a deciding portion that decides on a quantity of virtual currency to be provided to the user, based on the purchase information; a providing portion that provides the user with the virtual currency of the quantity decided on; an accepting portion that accepts, from the user, an exchange request to exchange the virtual currency for a substitute; a determining portion that determines, when the exchange request is accepted, whether or not it is within a predetermined period from a point of time when the virtual currency was provided; and an exchange processing portion that performs processing related to exchange of the virtual currency when it is determined that it is within the predetermined period.

2 Claims, 19 Drawing Sheets

Related U.S. Application Data

(60) Provisional application No. 62/813,953, filed on Mar. 5, 2019.

(51) Int. Cl.
*G06Q 20/12* (2012.01)
*G06Q 20/38* (2012.01)

(56) References Cited

U.S. PATENT DOCUMENTS

| | | | | |
|---|---|---|---|---|
| 2015/0073907 | A1* | 3/2015 | Purves | G06Q 20/384 |
| | | | | 705/14.58 |
| 2015/0363769 | A1* | 12/2015 | Ronca | G06Q 40/04 |
| | | | | 705/64 |
| 2016/0232244 | A1* | 8/2016 | Liu | G06F 3/011 |
| 2017/0161729 | A1* | 6/2017 | Wang | G06Q 20/405 |
| 2017/0161734 | A1* | 6/2017 | Bankston | G06Q 20/3829 |
| 2017/0372278 | A1* | 12/2017 | Frolov | H04L 9/50 |
| 2018/0113914 | A1* | 4/2018 | Mehedy | G06F 16/248 |
| 2019/0012692 | A1 | 1/2019 | Matsumoto | |
| 2019/0308103 | A1* | 10/2019 | Lahav | G06F 11/3438 |
| 2019/0385183 | A1* | 12/2019 | Ryu | H04L 9/3239 |
| 2020/0027160 | A1 | 1/2020 | Sogawa et al. | |
| 2020/0042971 | A1* | 2/2020 | Eby | G06Q 20/401 |
| 2020/0219093 | A1* | 7/2020 | Malhotra | H04L 67/06 |
| 2020/0342444 | A1 | 10/2020 | Takaoka | |
| 2021/0019738 | A1* | 1/2021 | Koppelman | G06Q 20/3224 |
| 2021/0357882 | A1* | 11/2021 | Kang | G06Q 20/0855 |

FOREIGN PATENT DOCUMENTS

| | | |
|---|---|---|
| JP | 2008-287550 A | 11/2008 |
| JP | 2017-207938 A | 11/2017 |
| JP | 2017-228040 A | 12/2017 |
| JP | 2018-41189 A | 3/2018 |
| JP | 2018-88294 A | 6/2018 |
| JP | 6364516 B1 | 7/2018 |
| JP | 2018-169913 A | 11/2018 |
| JP | 6475387 B1 | 2/2019 |
| JP | 2019-125201 A | 7/2019 |
| WO | WO2017104064 A1 | 6/2017 |
| WO | WO2017187538 A1 | 11/2017 |
| WO | WO-2019125578 A1 * | 6/2019 ............ G06Q 20/12 |

OTHER PUBLICATIONS

"Russia Burger King issues its own virtual currency "Whopper Coin"", AdGang, [Online], PR Times Inc., Sep. 8, 2017, pp. 1, 2, [retrieval date: Jan. 17, 2019], <URL: https://adgang.jp/2017/09/150226.html>, in particular, "Case: Whoppercoin"; English abstract enclosed.

DSPlus A Decentralized Cashback Platform on the Ethereum Blockchain, [online], DS Plus, Dec. 8, 2017, pp. 1-20, [retrieval date: Apr. 4, 2019], <URL:http:/web.archive.org/web/20171208011526/https://pluscoin.io/whitepaper/WP%20PlusCoin%20-%20(ENG).pdf>.

English translation of International Search Report for PCT Application No. PCT/JP2020/009372 mailed Jun. 9, 2020, 3 pages.

Kimura, "Start right now! Virtual currency, Financial management techniques of inevitable soaring", Magazinebox KK, Kimura, Shigeru, Feb. 1, 2018, pp. 56-59, ISBN: 978-4-86640-051-8, in particular, section "1. Get from bitFlyer"; English abstract enclosed.

Maacha, "Register & deposit with PlusCoin ICO! Projects that many major foreign chains entry into the partners", Virtual Currency. Press, Sep. 22, 2017, [retrieved on Jan. 16, 2019], Internet <URL: https:// virtual-currency.press/pluscoin_ico_plc>; English abstract enclosed.

English translation of International Search Report for PCT Application No. PCT/JP2020/009371 mailed Jun. 16, 2020, 3 pages.

Russo, "Lolli Lets You Earn Free Bitcoin by Shopping Top Brands", sludgefeed.com, Jul. 11, 2018, <URL: https://sludgefeed.com/lolli-lets-you-earn-free-bitcoin-shopping-online/>, [retrieval date: May 27, 2020].

Todoroki, "PlusCoin ICO—Already signed with 1544 partner companies, Attractive Cashback!", Exciting virtual currency (Cryptocurrency), Sep. 29, 2017, https://wakuwaku-currency.com/investment/pluscoin.html, [retrieval date: Jan. 17, 2019]; English abstract enclosed.

English translation of International Search Report for PCT Application No. PCT/JP2020/009370 mailed Jun. 9, 2020, 3 pages.

* cited by examiner

FIG. 2
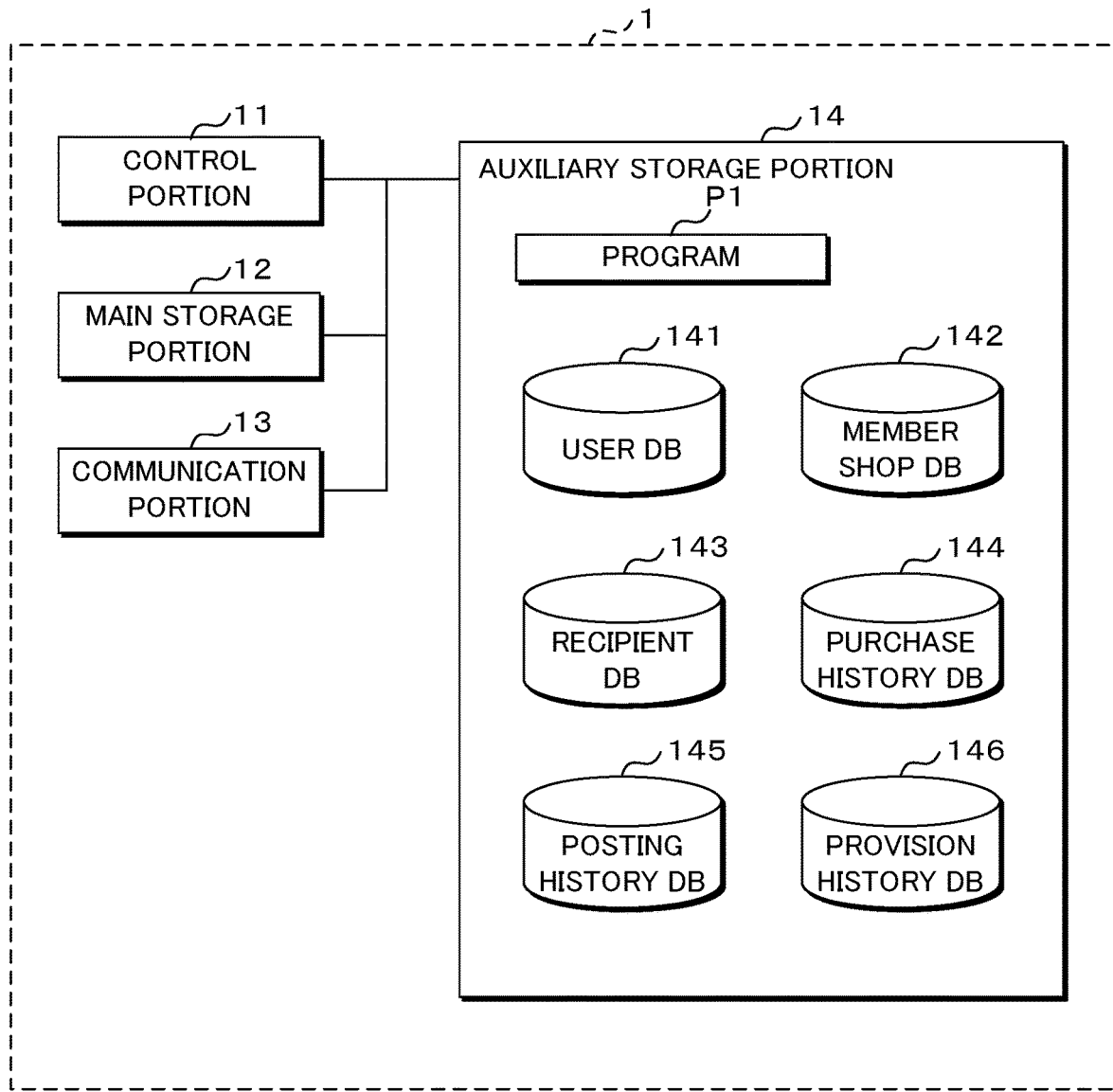
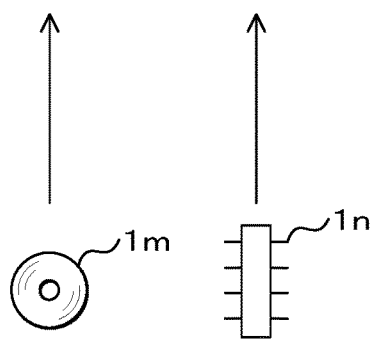

| USER ID | USER NAME | WALLET | SNS | INDIVIDUAL INFORMATION |
|---|---|---|---|---|
| 10001 | Yamada Taro | XXX | XXX | XXX |
| 10002 | Tanaka Hanako | XXX | XXX | XXX |
| 10003 | Sato Ichiro | XXX | XXX | XXX |
| ... | ... | ... | ... | ... |

142

| MEMBER SHOP ID | MEMBER SHOP NAME | MEMBER SHOP INFORMATION | COMMISSION RATE |
|---|---|---|---|
| 20001 | A | XXX | 10% |
| 20002 | B | XXX | 5% |
| 20003 | C | XXX | 8% |
| ... | ... | ... | ... |

143

| GROUP ID | GROUP NAME | IMAGE |
|---|---|---|
| 40001 | α | xxx.jpg |
| 40002 | β | xxx.jpg |
| 40003 | γ | xxx.jpg |
| ... | ... | ... |

144

| PURCHASE ID | PURCHASER | MEMBER SHOP | DATE | PURCHASED COMMODITY | PURCHASE AMOUNT |
|---|---|---|---|---|---|
| 30001 | 10001 | 20001 | 2019/4/1 | a | 40,000 |
| 30002 | 10011 | 20011 | 2019/4/1 | b | 50,000 |
| 30003 | 10111 | 20111 | 2019/4/1 | c | 100,000 |
| ... | ... | ... | ... | ... | ... |

145

| POSTING ID | POSTING DATE | SNS | POSTER | POSTING INFORMATION |
|---|---|---|---|---|
| 50001 | 19/4/1/12:00 | F | 10001 | XXX |
| 50002 | 19/4/1/12:01 | T | 10011 | XXX |
| 50003 | 19/4/1/12:02 | F | 10111 | XXX |
| ... | ... | ... | ... | ... |

146

| DATE | TOKENBACK | | | DONATION | | | | APPROVAL |
|---|---|---|---|---|---|---|---|---|
| | USER | PROVISION QUANTITY | TRANS-ACTION | RECIPIENT | DONATION QUANTITY | TRANS-ACTION | POSTING | |
| 19/4/1/12:00 | 10001 | 0.45 | XXX | 40001 | 0.05 | XXX | 50001 | APPROVED |
| 19/4/1/12:01 | 10011 | 0.27 | XXX | 40011 | 0.03 | XXX | 50002 | APPROVED |
| 19/4/1/12:02 | 10111 | 0.9 | XXX | 40111 | 0.1 | XXX | 50003 | NON-APPROVED |
| ... | ... | ... | ... | ... | ... | ... | ... | ... |

FIG. 19

Dashboard ≡

| APPROVED COINS | COINS UNDER DETERMINATION |
|---|---|
| 35 COINS<br>35,000YEN | 15.69 COINS<br>15,690 YEN |

PRESENT CURRENT PRICE PER ONE COIN
1 COIN=1,000 YEN ─ 191

─ 192

| DATE | RETURNED COIN | EXCHANGE RATE | BUYBACK GUARANTEE |
|---|---|---|---|
| | 1.00 | ¥1,000/coin | All |
| 1/19 | 0.90 | ¥990/coin | SHOPPING ONLY |
| 1/19 | 0.80 | ¥990/coin | SHOPPING ONLY |
| 1/19 | 0.70 | ¥980/coin | SHOPPING ONLY |

Dashboard ≡

| APPROVED COINS | COINS UNDER DETERMINATION |
|---|---|
| 35 COINS<br>35,000YEN | 15.69 COINS<br>15,690 YEN |

PRESENT CURRENT PRICE PER ONE COIN
1 COIN=1,000 YEN ─ 191

IN ORDER OF DATE OF USE ∨ ─ 192

| STATUS | USED MEMBER SHOP | DATE OF USE | FIXED DA |
|---|---|---|---|
| Temporary | EC SITE A | 2019/11/20 | ─ |
| Approval | EC SITE B | 2019/11/10 | 2019/11/ |
| Approval | EC SITE B | 2019/11/09 | 2019/11/ |
| Approval | EC SITE C | 2019/11/01 | 2019/11/ |

INFORMATION PROCESSING APPARATUS, INFORMATION PROCESSING METHOD, AND NON-TRANSITORY COMPUTER-READABLE STORAGE MEDIUM

CROSS-REFERENCE TO RELATED APPLICATIONS

This application is a continuation application of PCT International Application No. PCT/JP2020/009372, which has an International filing date of Mar. 5, 2020, and designated the United States of America, and claiming priority on Application No. 62/813,953 filed in the United States of America on Mar. 5, 2019, and Patent Application No. 2019-132200 filed in Japan on Jul. 17, 2019.

FIELD

The present invention relates to an information processing apparatus, an information processing method, and a non-transitory computer-readable storage medium.

BACKGROUND

The utilization of virtual currency has been considered that is realized by use of the distributed ledger technology typified by block chain. For example, Japanese Patent Application Laid-Open No. 2018-88294 proposes a virtual currency system that handles a virtual currency circulating only in a specific region for regional developments and in which a virtual currency higher in value than the cash deposited by a consumer is provided to the consumer and the provided virtual currency is decreased in value with time. According to Japanese Patent Application Laid-Open No. 2018-88294, since the virtual currency decreases in value, the consumption of the virtual currency is encouraged, so that the economic activities of the region are stimulated.

SUMMARY

However, the invention according to Japanese Patent Application Laid-Open No. 2018-88294 merely encourages the consumption of the virtual currency.

According to one aspect, an object is to provide an information processing apparatus and the like capable of appropriately assisting consumers by use of a virtual currency.

An information processing apparatus according to one aspect is provided with: an obtaining portion that obtains purchase information on a commodity or a service purchased by a user; a deciding portion that decides on a quantity of virtual currency to be provided to the user, based on the purchase information; a providing portion that provides the user with the virtual currency of the quantity decided on; an accepting portion that accepts, from the user, an exchange request to exchange the virtual currency for a substitute; a determining portion that determines, when the exchange request is accepted, whether or not it is within a predetermined period from a point of time when the virtual currency was provided; and an exchange processing portion that performs processing related to exchange of the virtual currency when it is determined that it is within the predetermined period.

According to one aspect, consumers can be appropriately assisted by using virtual currency. The above and further objects and features will more fully be apparent from the following detailed description with accompanying drawings.

BRIEF DESCRIPTION OF THE DRAWINGS

FIG. 2 is a block diagram showing a structure example of a server.
FIG. 4 is an explanatory view showing an example of the record layouts of a user DB, a member shop DB, a recipient DB, a purchase history DB, a posting history DB and a provision history DB.
FIG. 19 is an explanatory view showing an example of a provision history screen.

DETAILED DESCRIPTION

Hereinafter, the present invention will be described in detail based on the drawings showing embodiments thereof.

Embodiment 1

Figure 1:
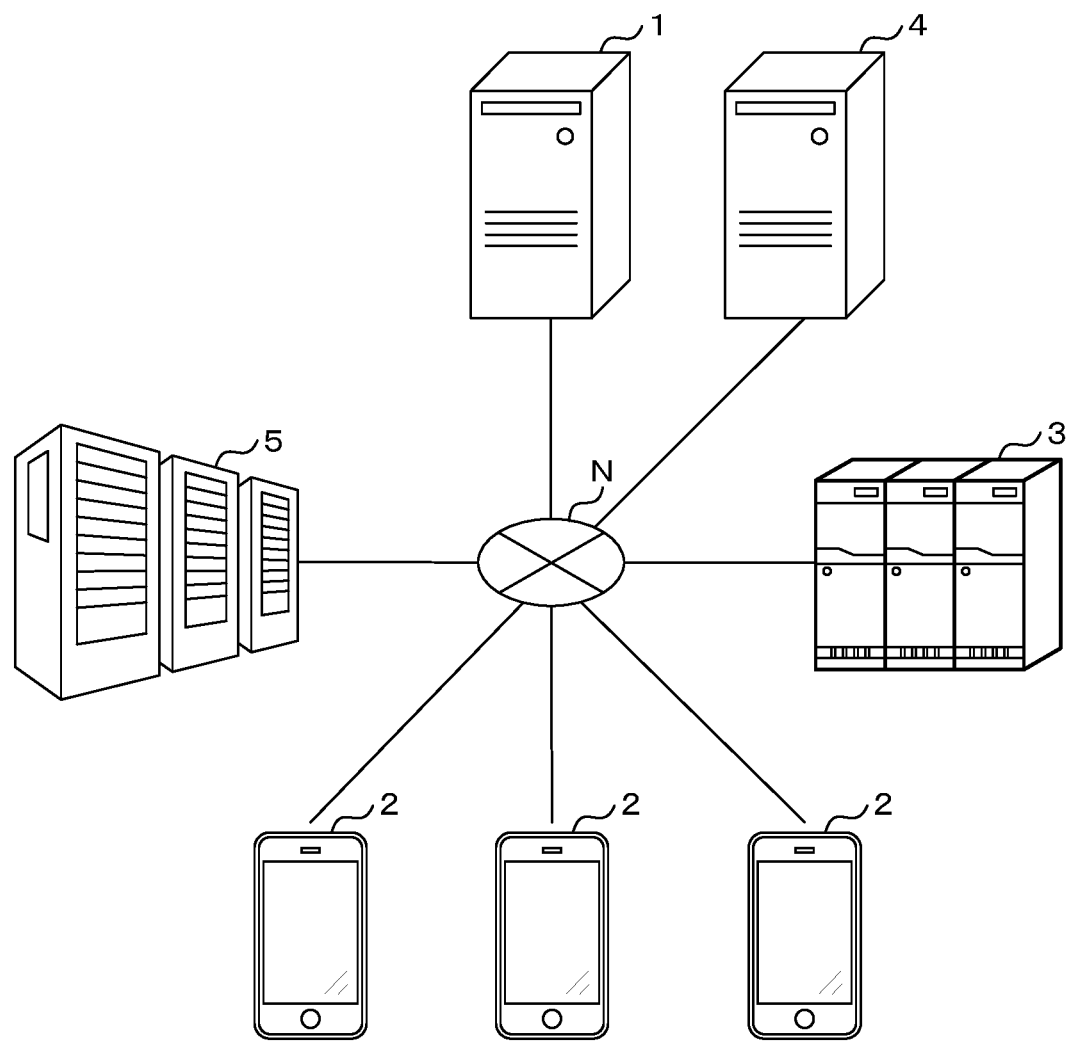
FIG. 1 is a schematic view showing a structure example of a tokenback system.

FIG. 1 is a schematic view showing a structure example of a tokenback system. In the present embodiment, a tokenback system will be described in which a virtual currency (token) is provided to a user who purchased a commodity or a service (hereinafter, referred to as "commodity or the like") with legal currency at a predetermined member shop. The tokenback system includes an information processing apparatus 1, terminals 2, an exchange server 3, an EC (Electric Commerce) server 4, and an issuing server 5. These devices are interconnected so as to communicate with one another through a network N such as the Internet.

The information processing apparatus 1 is an information processing apparatus capable of various kinds of information processing and information transmission and reception, and is, for example, a server computer or a personal computer. In the present embodiment, the information processing apparatus 1 is a server computer, and in the following, it will be read as a server 1 for the sake of simplicity. The server 1 is a server computer of a manager who manages the present system, and performs cashback in a token (tokenback) to the users who purchased commodities or the like at member shops joining the present system. The token is a virtual currency unique to the present system and the transaction history of which is recorded in a block chain.

The virtual currency provided by the server 1 is not necessarily a unique token but may be an existing virtual currency such as Bitcoin (trademark) or Ethereum (trademark).

The terminal 2 is a terminal device of each user who uses the present system, and is, for example, a smartphone, a tablet terminal or a personal computer. In the present embodiment, description will be given on the assumption that the terminal 2 is a smartphone provided with a touch panel. The terminal 2 is preinstalled with an application program for implementing a function according to the present system, and the terminal 2 performs later-described processing by executing the application program.

The exchange server 3 is a server computer of a virtual currency exchange service provider that provides a virtual currency exchange. The token according to the present embodiment is listed on one or more than one exchange, and the user can sell or buy the token at the exchange.

The EC server 4 is a server computer of an EC site (virtual shop) business operator that provides an electronic commerce transaction service. The present system is joined not only by business operators that handle the sale of commodities or the like at real shops but also by EC site business operators. Each user can receive tokens when purchasing a commodity or the like at a real shop or an EC site that is a member shop.

The issuing server 5 is a server computer that issues the token according to the present embodiment and controls the upper limit of token issuance. In the present system, the issuing server 5 issues tokens and supplies them to a trading market (exchange, etc.). The upper limit of token issuance is determined at the issuing server 5, and the issuing server 5 adjusts the issuance quantity (issues new tokens) while referring to the supply and demand situation of the token at the market.

FIG. 2 is a block diagram showing a structure example of the server 1. The server 1 is provided with a control portion 11, a main storage portion 12, a communication portion 13 and an auxiliary storage portion 14. The control portion 11 has one or more arithmetic processing unit such as a CPU (Central Processing Unit), an MPU (Micro-Processing Unit) or a GPU (Graphics Processing Unit), and performs various kinds of information processing, control processing and the like related to the server 1 by reading a program P1 stored in the auxiliary storage portion 14 and executing it. The main storage portion 12 is a temporary storage area such as an SRAM (Static Random Access Memory), a DRAM (Dynamic Random Access Memory) or a flash memory, and temporarily stores data necessary for the control portion 11 to execute arithmetic processing. The communication portion 13 includes a processing circuit and the like for performing processing related to communication, and performs information transmission and reception with the terminal 2 and the like.

The auxiliary storage portion 14 is a large-capacity memory, a hard disk or the like, and stores the program P1 necessary for the control portion 11 to execute processing, and other data. Moreover, the auxiliary storage portion 14 stores a user DB 141, a member shop DB 142, a recipient DB 143, a purchase history DB 144, a posting history DB 145 and a provision history DB 146. The user DB 141 is a database storing information on each user. The member shop DB 142 is a database storing information on each member shop (real shop or EC site). The recipient DB 143 is a database storing information on groups and the like registered as token recipients. As described later, in the present embodiment, when tokens are provided to each user, some of the provided tokens are made to be donated to a recipient registered in the recipient DB 143.

The purchase history DB 144 is a database storing the history of purchase of commodities or the like by each user. The posting history DB 145 is a database storing the history of posting to an SNS (Social Networking Service) by each user. As described later, in the present embodiment, when tokens are provided to each user, the tokens are provided on condition that a posting to an SNS is made. The provision history DB 146 is a database storing the history of token provision (the history of tokenback) to each user.

The auxiliary storage portion 14 may be an external storage device connected to the server 1. Moreover, the server 1 may be a multicomputer formed of a plurality of computers or may be a virtual machine virtually constructed by software.

Moreover, in the present embodiment, the server 1 is not limited to the above-described structure but may include, for example, an input portion that accepts an operation input and a display portion that displays an image. Moreover, the server 1 may be provided with a reading portion that reads a portable storage medium 1m such as a CD (Compact Disk)-ROM or a DVD (Digital Versatile Disc)-ROM, and read the program P1 from the portable storage medium 1m and execute it. Alternatively, the server 1 may read the program P1 from a semiconductor memory in.

Figure 3:
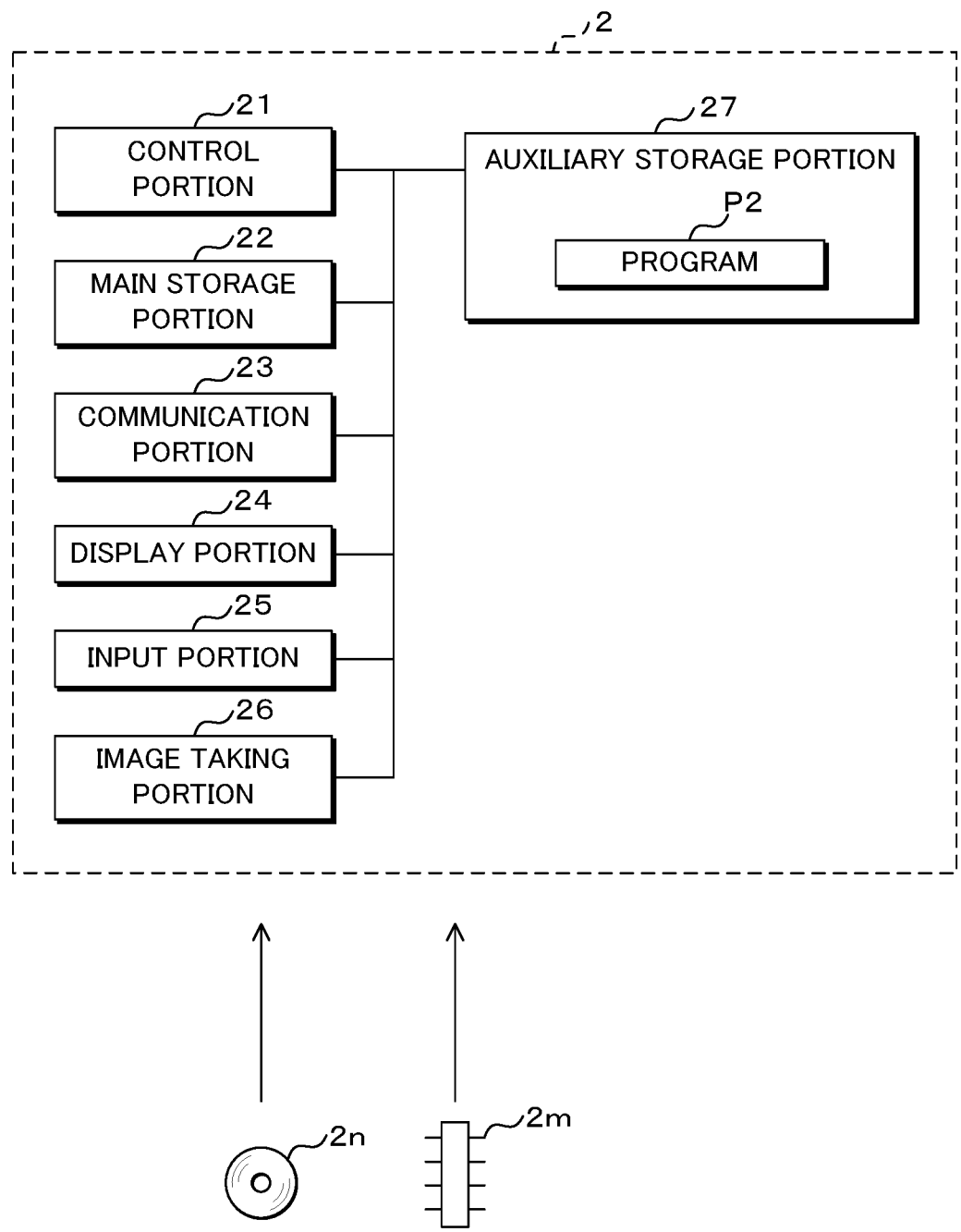
FIG. 3 is a block diagram showing a structure example of a terminal.

FIG. 3 is a block diagram showing a structure example of the terminal 2. The terminal 2 is provided with a control portion 21, a main storage portion 22, a communication portion 23, a display portion 24, an input portion 25, an image taking portion 26 and an auxiliary storage portion 27. The control portion 21 has one or more arithmetic processing unit such as a CPU or an MPU, and performs various kinds of information processing, control processing and the like related to the terminal 2 by reading a program P2 stored in the auxiliary storage portion 27 and executing it. The main storage portion 22 is a temporary storage area such as a RAM, and temporarily stores data necessary for the control portion 21 to execute arithmetic processing. The communication portion 23 includes an antenna, a processing circuit and the like for performing communication, and performs information transmission and reception with the server 1 and the like. The display portion 24 is a display device such as a liquid crystal display, an organic EL (Electro Luminescence) display, and displays an image provided by the control portion 21. The input portion 25 is an input interface such as a touch panel or a mechanical key, and accepts an operation input from the user. The image taking portion 26 is a camera provided with an imaging element such as a CMOS (Complementary Metal Oxide Semiconductor), and performs image taking according to the operation input by the user. The auxiliary storage portion 27 is a non-volatile memory such as a ROM (Read Only Memory), and stores the program P2 necessary for the control portion 21 to execute processing, and other data.

The terminal 2 may be provided with a reading portion for reading a portable storage medium 2n, read the program P2 from the portable storage medium 2n and execute it. Alternatively, the terminal 2 may read the program P2 from a semiconductor memory 2m.

FIG. 4 is an explanatory view showing an example of the record layouts of the user DB 141, the member shop DB 142, the recipient DB 143, the purchase history DB 144, the posting history DB 145 and the provision history DB 146. The user DB 141 includes a user ID column, a user name column, a wallet column, an SNS column and an individual information column. The user ID column stores user IDs for identifying users. The user name column, the wallet column, the SNS column and the individual information column store, in association with the user IDs, the users' names, the wallet information (for example, the public key) necessary for sending tokens to the users, information on the users' SNS accounts and the users' individual information (the sex, age, nationality, etc.), respectively.

The member shop DB 142 includes a member shop ID column, a member shop name column, a member shop information column and a commission rate column. The member shop ID column stores member shop IDs for identifying member shops. The member shop name column, the member shop information column and the commission rate column store, in association with the member shop IDs, the names of the member shops, other information on the member shops and the rate of the commission collected from the member shops, respectively.

The recipient DB 143 includes a group ID column, a group name column and an image column. The group ID column stores group IDs for identifying groups and the like registered as recipients. The group name column and the image column store, in association with the group IDs, the names of the groups and the like as recipients and the image data that the users use for posting to SNSs when making donations to the groups and the like, respectively.

The purchase history DB 144 includes a purchase ID column, a purchaser column, a member shop column, a date column, a purchased commodity column and a purchase amount column. The purchase ID column stores purchase IDs assigned to individual purchase histories (purchase information) when the users purchased commodities or the like from member shops. The purchaser column, the member shop column, the date column, the purchased commodity column and the purchase amount column store, in association with the purchase IDs, the user IDs of the users as the purchasers, the member shop IDs of the member shops where the users purchased commodities or the like, the dates when the commodities or the like were purchased, the names of the purchased commodities or the like and the purchase amount, respectively.

The posting history DB 145 includes a posting ID column, a posting date column, an SNS column, a poster column and a posting information column. The posting ID columns stores posting IDs assigned to individual pieces of posting information posted to the SNSs by the users. The posting date column, the SNS column, the poster column and the posting information column store, in association with the positing IDs, the posting dates, the SNSs to which the postings were made, the user IDs of the users as the posters and the posting contents (data such as texts and images), respectively.

The provision history DB 146 includes a date column, a tokenback column, a donation column and an approval column. The date column stores the date when tokens were provided to the users. The tokenback column, the donation column and the approval column store, in association with the dates, information on the tokenback to the users, information on the donations and the presence or absence of token provision approval from the member shops, respectively. The tokenback column stores, for example, the user IDs of the users to which tokens are to be provided, the quantity of provided tokens and the IDs of the transactions created for providing (sending) the tokens. The donation column stores, for example, the group IDs of the groups and the like as the recipients, the quantity of donated tokens, the IDs of the transactions created for donating (sending) the tokens, and the posting IDs of the posting information on the users' postings to the SNSs with reference to the token donations.

Figure 5:
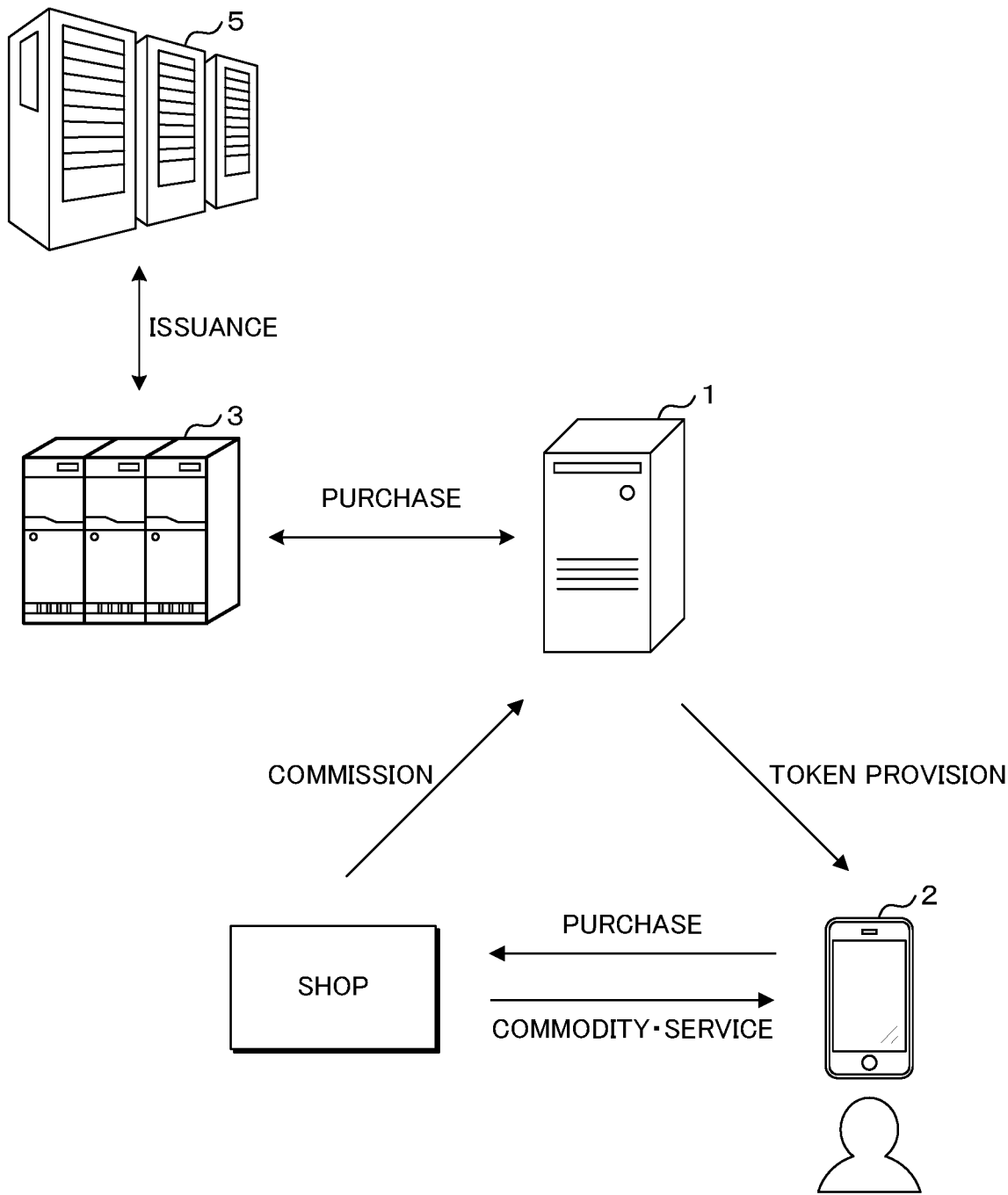
FIG. 5 is an explanatory view showing the general outline of token provision processing.

FIG. 5 is an explanatory view showing the general outline of token provision processing. Based on FIG. 5, the general outline of the present system will be described. As described above, in the present embodiment, the token unique to the present system is handled. The token is supplied to the trading market, for example, by the issuing server 5 separate from the server 1, and the upper limit of issuance is controlled. At the exchange (trading market) provided by the exchange server 3, the users can sell or buy tokens circulating in the market.

The server 1 is a managing apparatus that manages the processing of cashback (tokenback) with the token as the medium, and provides the quantity of tokens corresponding to the purchase amount of the purchased commodities or the like to the users who purchased the commodities or the like.

The "token provision" referred to in the present embodiment may include any of the processing of registering a transaction for sending tokens to the user into a database (for example, the provision history DB 146) and the processing of broadcasting the transaction to a block chain network and actually sending the tokens to the user's wallet. In the former case, upon request from the terminal 2, the server 1 broadcasts the transaction registered in the database and sends the tokens provided to the user to the wallet.

The present system is joined by a plurality of member shops such as real shops and EC sites (virtual shops), and when users purchased commodities or the like at member shops, the server 1 collects commissions corresponding to the purchase amounts of the commodities or the like from the member shops and provides tokens by using the commissions as the source of funds. The rate of commissions collected from the member shops is determined by the member shop DB 142. The server 1 calculates the commission by multiplying the purchase amount by the commission rate, and requests the member shop to pay the calculated commission. The server 1 performs tokenback by using the commission paid by the member shop as the source of fund.

In this case, based on the commission paid by the member shop, the server 1 outputs a purchase request (so-called offer) to purchase tokens to the exchange server 3 and purchases the tokens. That is, the server 1 procures the tokens from the virtual currency trading market by using the commission from the member shop as the source of fund.

First, the server 1 obtains, from the exchange server 3, current price information indicative of the current price (the price per unit quantity when the token is converted into the legal currency) of the token. That is, the server 1 obtains, from the exchange server 3, data representative of the market price of the token at the trading market (exchange, etc.). The information on the current price of the token may be obtained not from the exchange server 3 but from an external site that publishes the information on the current price of virtual currency.

Referring to the current price information, the server 1 calculates the quantity of tokens that can be purchased with the commission from the member shop. Then, the server 1 outputs, to the exchange server 3, a purchase request to purchase the calculated quantity of tokens at the current price. The server 1 purchases tokens from the holder of the tokens through the exchange server 3. The server 1 uses the purchased tokens to the provision to the user.

Since there is a time lag from the user's purchase of the commodity or the like to the completion of the commission payment (receipt) from the member shop, in actuality, after the tokens are provided to the user, the purchase request is outputted to procure (replenish) the tokens from the market. It is needless to say that the token provision to the user may be performed after the completion of procurement of the tokens.

Moreover, while tokens are procured from the exchange server 3 (exchange) in the present embodiment, for example, the server 1 may procure (purchase) tokens from the issuing server 5 as the token issuer.

As described above, when a user purchases a commodity or the like at a member shop, the server 1 procures tokens from the market by using the commission from the member shop as the source of fund. As a result of this, the demand for the tokens at the market is forcibly increased.

Moreover, when providing tokens, the server 1 obtains holding information representative of the situation of token holding by the user, and provides tokens according to the obtained holding information. The holding information is data representative of the holding quantity, holding period and the like of the tokens. For example, the server 1 obtains data such as the holding quantity, holding period and the like of the tokens held by the user with reference to the token provision history stored in the provision history DB 146. Alternatively, the server 1 may obtain the user's current holding information from the block chain based on the wallet information stored in the user DB 141. The server 1 provides tokens based on the obtained holding information.

For example, the server 1 determines whether the holding quantity of the tokens held by the user is not less than a predetermined quantity or not, and when determining that the user holds not less than the predetermined quantity of tokens, the server 1 provides tokens. While the quantity of tokens made as the criterion for determination is not specifically limited, for example, the server 1 determines whether the user holds not less than one token or not. As described above, the server 1 performs tokenback for users holding not less than a predetermined quantity of tokens. This makes the tokens themselves function as a kind of membership and provides users with an incentive to hold not less than a predetermined quantity of tokens.

The token holding quantity as the criterion for determination may be zero so that tokenback is performed for all the users.

Further, the server 1 performs weighting based on the user's token holding information, and varies the quantity of tokens provided to the user. For example, the server 1 varies the provision quantity according to the user's token holding quantity and holding period.

For example, the larger the holding quantity is, the larger the quantity of tokens that the server 1 provides to the user is. Moreover, the longer the holding period is, the larger the quantity of tokens that the server 1 provides to the user is. This encourages the user to hold more tokens for a longer period of time.

The above-described processing provides the user with an incentive to continue to hold tokens. Thereby, it can be expected that the user continues to hold tokens without consuming them. Under this condition, the more commodities or the like the user purchases at member shops, the less the circulation quantity of the tokens circulated in the market by the above-described token procurement is, so that the property value (market price) of the existing tokens held by the user relatively increases. This makes the purchasing act itself contribute to the user's property value formation.

As described above, in the present system, although token provision (tokenback) is performed similarly to a general cashback service, it is encouraged to continue to hold the provided tokens without consuming them. Thereby, increase in token price can be expected, so that not only a direct value by tokenback can be provided but also an indirect value (property value formation by price increase) can be provided.

When the user obtained tokens for value at the trading market (exchange, etc.) in order to further reduce the token circulation quantity, it is preferable to increase the quantity of tokens provided by purchase of a commodity or the like or increase the kinds of commodities or the like as the targets of token provision. That is, for the users having obtained tokens by a method other than tokenback (token provision by purchase of a commodity or the like), the server 1 increases the token provision quantity or increases the kinds of commodities or the like as the targets of the provision. This encourages the user to purchase tokens, so that the circulation quantity in the market can be further reduced.

Figure 6:
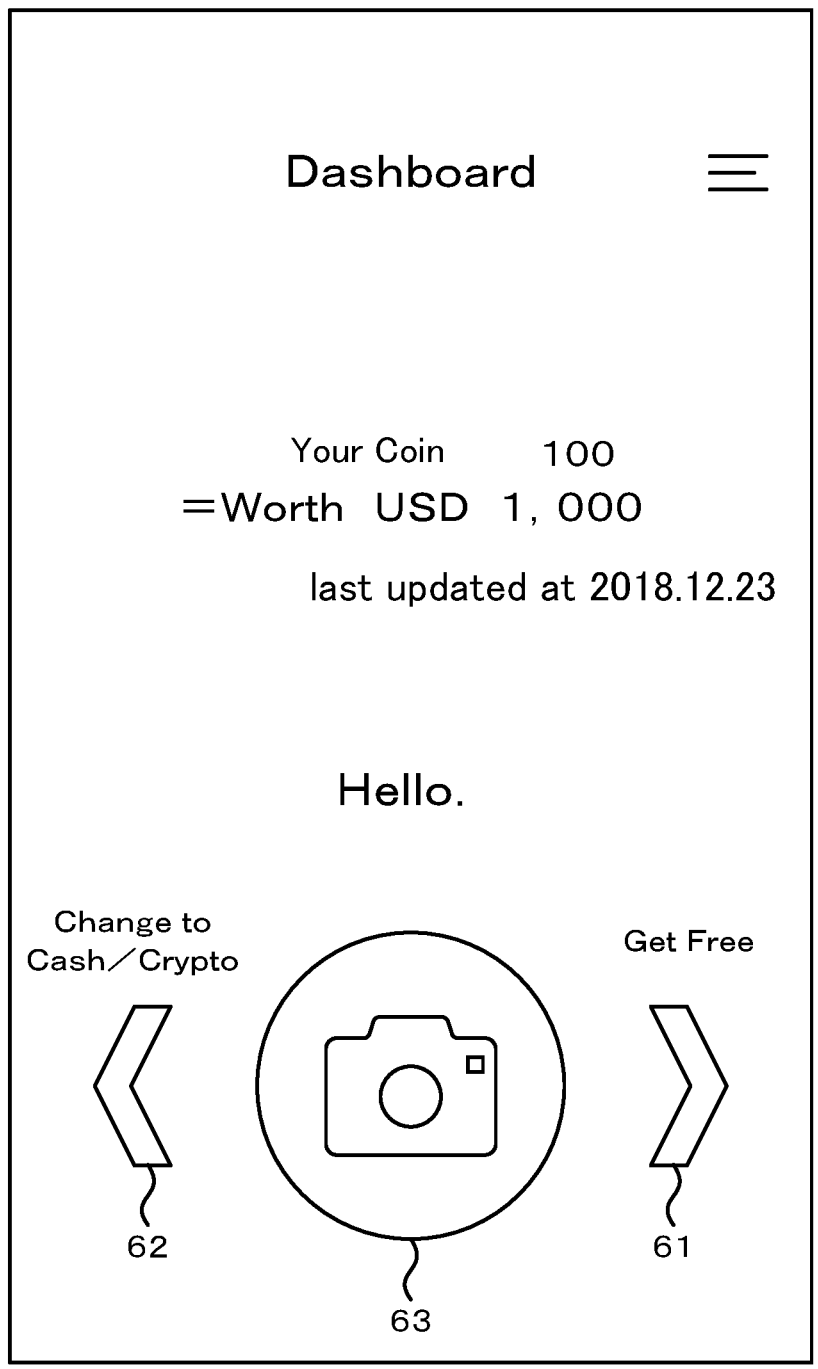
FIG. 6 is an explanatory view showing an example of a top screen.

FIG. 6 is an explanatory view showing an example of a top screen. Hereinafter, concrete processing contents of the present system will be described while describing an example of an operation at the terminal 2. As described above, the terminal 2 is installed with the application program according to the present system, and the application program is executed to perform the following processing. Screen display and operations may be performed on an API (Application Programmable Interface) such as a web browser. In FIG. 6, a top screen of the application is illustrated.

The top screen is a screen displaying the holding quantity of the tokens held by the user. As illustrated in FIG. 6, the terminal 2 displays, on the top screen, the holding quantity of the tokens currently held by the user and the amount equivalent to the legal currency when the tokens are converted into the legal currency complying with the user's nationality.

Moreover, the terminal 2 displays a left swipe icon 61, a right swipe icon 62 and a camera icon 63 on the top screen. The left swipe icon 61 is an icon to prompt operation input of a left swipe (an operation of swiping left on the screen) in order to shift to a later-described member shop list screen (see FIG. 7). The right swipe icon 62 is an icon to prompt operation input of a right swipe (an operation of swiping right on the screen) in order to shift to a later-described exchange screen (see FIG. 10). The camera icon 63 is an icon for shifting to a mode to take an image of a receipt of a member shop (real shop).

While shift from the top screen to another screen is made by "swipe" in the present embodiment, the operation may be, for example, an operation called flick or drag as long as it is an operation of sliding on the screen.

Figure 7:
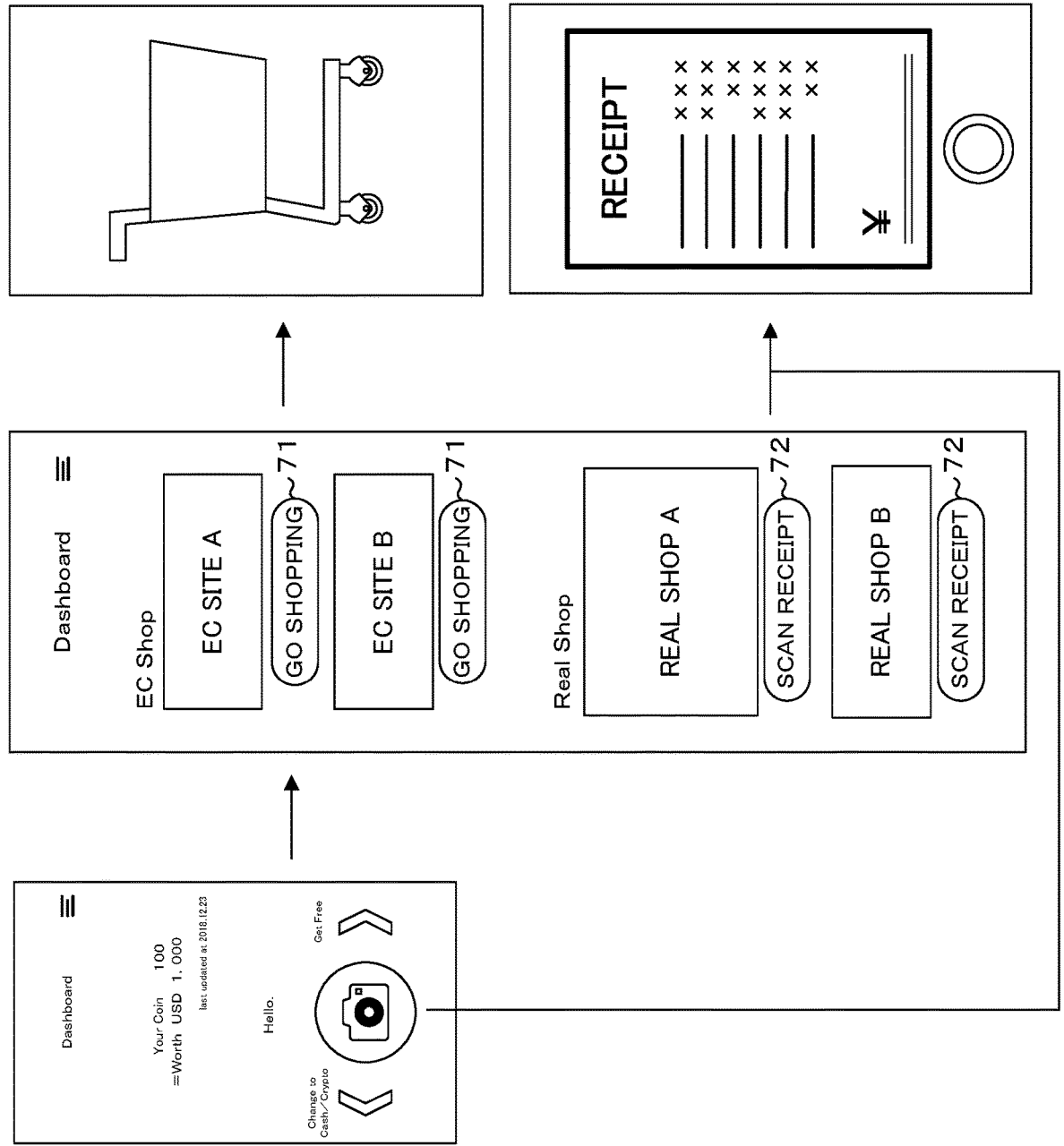
FIG. 7 is an explanatory view showing an example of a screen shift at the time of a left swipe operation.

FIG. 7 is an explanatory view showing an example of a screen shift at the time of a left swipe operation. When a swipe operation of swiping left (first direction) on the top screen according to the left swipe icon 61 is accepted, the terminal 2 shifts to the list screen (second screen) shown in the center of FIG. 7. The list screen is a display screen listing a plurality of member shops joining the present system. As shown in FIG. 7, on the list screen, member shops which are EC sites (virtual shops) providing business transaction services (first member shops) and member shops which are real shops (second member shops) are displayed in the form of a list.

The terminal 2 displays link buttons 71 in association with the EC sites on the list screen. When an operation input to a link button 71 is accepted, the terminal 2 accesses the EC site (the EC server 4) associated with the operated link button 71. The destination of the access may be the home screen or the like of the EC site or a direct shift to the screen of each individual commodity may be made from the link button 71.

The terminal 2 makes an application for purchase of a commodity or the like on the accessed EC site in accordance with the operation input from the user. When the user purchases a commodity or the like on the EC site, the server 1 obtains purchase information on the purchased commodity or the like from the EC server 4. The purchase information is data representative of the purchased commodity or the like, the purchase amount, the purchase date and the like. The server 1 stores the obtained purchase information into the purchase history DB 144.

While the purchase information is obtained from the EC server 4 in the present embodiment, the server 1 may directly obtain the information on the purchase on the EC site from the terminal 2. Alternatively, the server 1 may obtain the purchase information by way of an ASP (Affiliate Service Provider) or the like. It is necessary only that the server 1 is capable of obtaining the purchase information directly or indirectly from the terminal 2 by way of the list screen of FIG. 7, and the obtaining path does not specifically matter.

Moreover, the terminal 2 displays scan buttons 72 in association with the member shops that are real shops on the list screen. When an operation input to a scan button 72 is accepted on the list screen or when an operation input to the camera icon 63 is accepted on the top screen, the terminal 2 activates the image taking portion 26, and shifts to an image taking mode to take an image of a medium describing information on the commodity or the like purchased at a real shop (purchase information).

For example, the terminal 2 shifts to an image taking mode to take an image of a receipt distributed to the user at the real shop. The terminal 2 takes an image of the receipt according to the operation input from the user, and performs character recognition on the taken image to extract purchase information such as the purchased commodity or the like, the purchase amount and the purchase date. The terminal 2 transmits the extracted purchase information to the server 1.

While a receipt is read in the description of the present embodiment, the target medium is not limited to a receipt but may be code information such as a QR code (trademark). That is, it is necessary only that the terminal 2 is capable of taking an image of a predetermined medium to extract purchase information, and the target thereof is not limited to paper medium where text is printed.

Moreover, while the information on the purchase at a member shop that is a real shop is obtained from the terminal 2 in the present embodiment, for example, the server 1 may obtain the purchase information from the POS (Point of Sales) system of the real shop.

When the purchase information is obtained from the terminal 2 or the EC server 4, as described above, the server 1 requests the member shop to pay a commission corresponding to the purchase amount of the commodity or the like. The server 1 outputs a token purchase request to the exchange server 3 based on the commission paid by the member shop, and purchases tokens.

Moreover, the server 1 provides the user with the quantity of tokens corresponding to the purchase amount of the commodity or the like. For example, the server 1 obtains the information on the current price of the tokens from the exchange server 3, and converts the commission determined according to the purchase amount into the quantity of tokens according to the current price. The server 1 provides the user with the converted quantity of tokens.

In this case, as described above, the server 1 obtains the user's token holding information, and decides on the quantity of tokens to be provided with reference to the obtained holding information. Specifically, the server 1 performs weighting according to the user's token holding quantity and holding period, and decides on the token provision quantity.

When the above-described processing related to token provision is performed, a case is considered where the upper limit of token issuance is reached and token provision to the user is impossible. "The upper limit of issuance is reached" can include not only a case where the upper limit of the issuance quantity is actually reached but also a case where the issuance quantity is close to the upper limit. When the upper limit of issuance is reached and it is difficult to purchase (procure) tokens from the exchange server 3, the server 1 provides the user with another virtual currency or the legal currency instead of the token according to the present system. Thereby, the case where the upper limit of issuance is reached can be handled.

When the upper limit of issuance is not reached or when it is possible to purchase tokens from the exchange server 3, the server 1 provide the user with the tokens of the quantity decided on in the above. In this case, the server 1 makes the user donate some of the tokens to be provided, to a predetermined recipient (outsider), and provides tokens on condition that the user makes a posting indicating that the tokens are donated, to an SNS.

Figure 8:
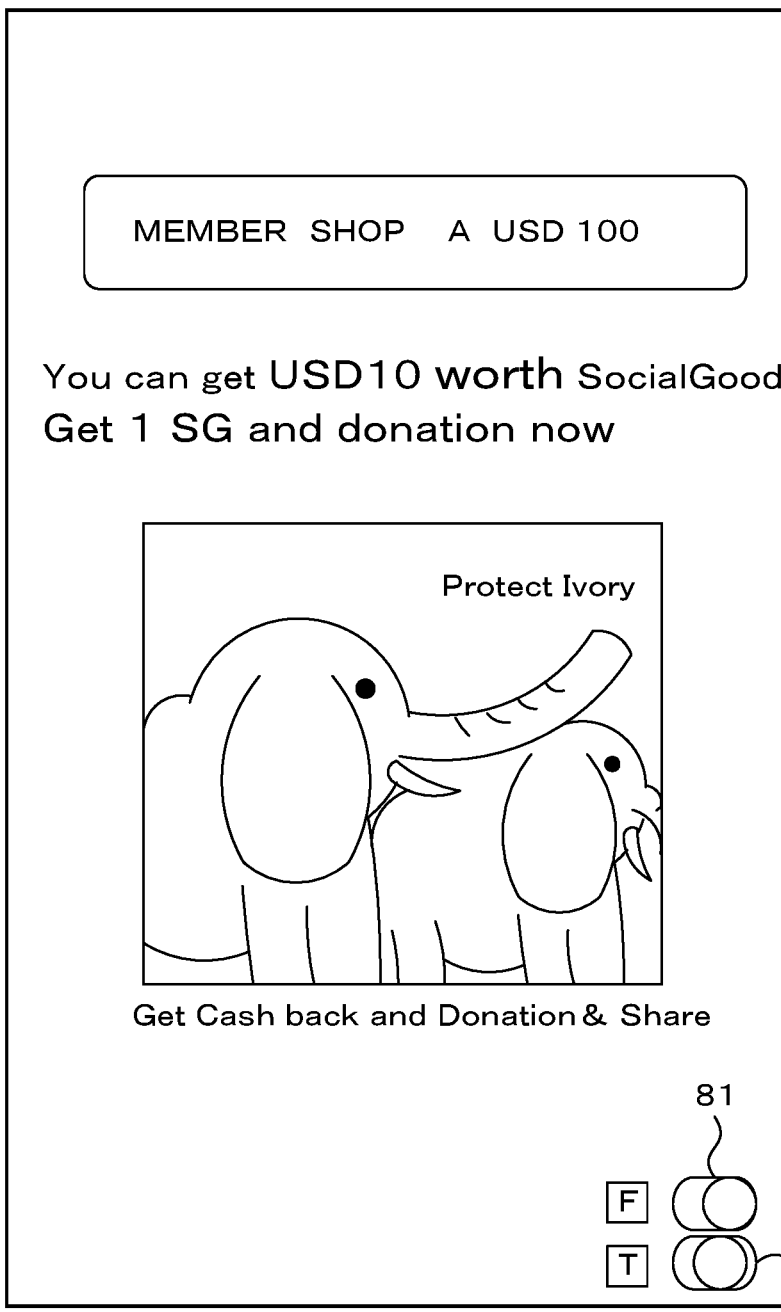
FIG. 8 is an explanatory view showing an example of a notification screen related to tokens to be provided.

FIG. 8 is an explanatory view showing an example of a notification screen related to the tokens to be provided. After the purchase application at the EC site described with reference to FIG. 7 or the receipt reading is completed, the terminal 2 receives a notification from the server 1, and shifts to the screen (fourth screen) of FIG. 8. The screen is a display screen that displays the quantity of tokens to be provided to the user and prompts token donation and posting to an SNS.

As shown in FIG. 8, the terminal 2 displays, in an upper part of the screen, the name of the member shop where the commodity or the like was purchased, the quantity of tokens provided by the purchase of the commodity or the like at the member shop, and the amount obtained by converting the tokens to be provided into the legal currency. The server 1 notifies the terminal 2 of these pieces of information and makes them displayed on the screen of FIG. 8.

Further, the terminal 2 displays a message saying that some of the tokens to be provided should be donated and a posting indicating the donation should be made to an SNS. For example, as shown in FIG. 8, the terminal 2 displays an image of a recipient registered (stored) in the recipient DB 143 and displays a text saying that donation or positing should be made, in a lower part of the screen. Moreover, the terminal 2 displays toggle switches 81 for selecting an SNS to which posting is made, and makes the user to select one or more SNSs to which posting is made.

After the selection with the toggle switches 81 is completed, the terminal 2 shifts to a non-illustrated screen, and accepts input of a comment (text) to be posted to the SNS, from the user. Then, the terminal 2 outputs, onto the SNS, posting information including the image of the recipient shown in FIG. 8 in addition to the text inputted by the user on the user's own SNS account.

The server 1 calls the API of the SNS, and determines whether the posting information is outputted or not, that is, whether posting to the SNS is completed or not. When posting is completed, the server 1 stores the posting information outputted from the terminal 2 to the SNS, into the posting history DB 145 in association with the posting date. Moreover, the server 1 provides tokens to the user. Specifically, the server 1 generates a transaction for sending tokens to the user's wallet, and registers (stores) it into the provision history DB 146. In this case, the server 1 registers the transaction with its status as "awaiting approval." Thereafter, the server 1 accepts approval for token provision from the member shop (the EC server 4, etc.) that pays the commission. When the approval for token provision is accepted, the server 1 updates the status to "approved." When the status is updated to "approved," the server 1 outputs the transaction to the block chain in response to a request from the terminal 2, and sends the tokens excluding the donated ones to the user's wallet.

Moreover, the server 1 sends the tokens to be donated, to the recipient at a given time after the status is updated to "approved." The donation may be made in cash (legal currency) or the like instead of in tokens.

While the recipient of the token donation and the quantity of tokens to be donated (donation amount) may be made arbitrarily specifiable by the user, they may be automatically decided on by the server 1. For example, the server 1 analyzes the user's tendency based on the history of purchase of commodities or the like by the user, and decides on the recipient and the donation quantity. For example, the server 1 previously associates commodities or the like with recipients and donation quantities, and decides on the recipient and the donation quantity on a contents basis according to the commodity or the like purchased by the user. Moreover, for example, the server 1 compares the target user's purchase history with other users' purchase histories, and decides on the recipient and the donation quantity so that the donation is the same as the donation made by another user with a similar history by using collaborative filtering.

Moreover, the server 1 may send the tokens while distributing them to a plurality of recipients in a single donation. The recipients and the distribution of the donation quantity in this case may be made arbitrarily specifiable by the user as the above or may be automatically decided on by the server 1 based on the purchase history or the like.

While donation of tokens and posting to an SNS are a condition of token provision in the above, donation and posting are not a mandatory requirement, and tokens may be provided with no donation nor posting.

Moreover, while tokens are provided to the user after approval from the member shop in the above, tokens may be provided with approval from the member shop being unnecessary.

Figure 9:
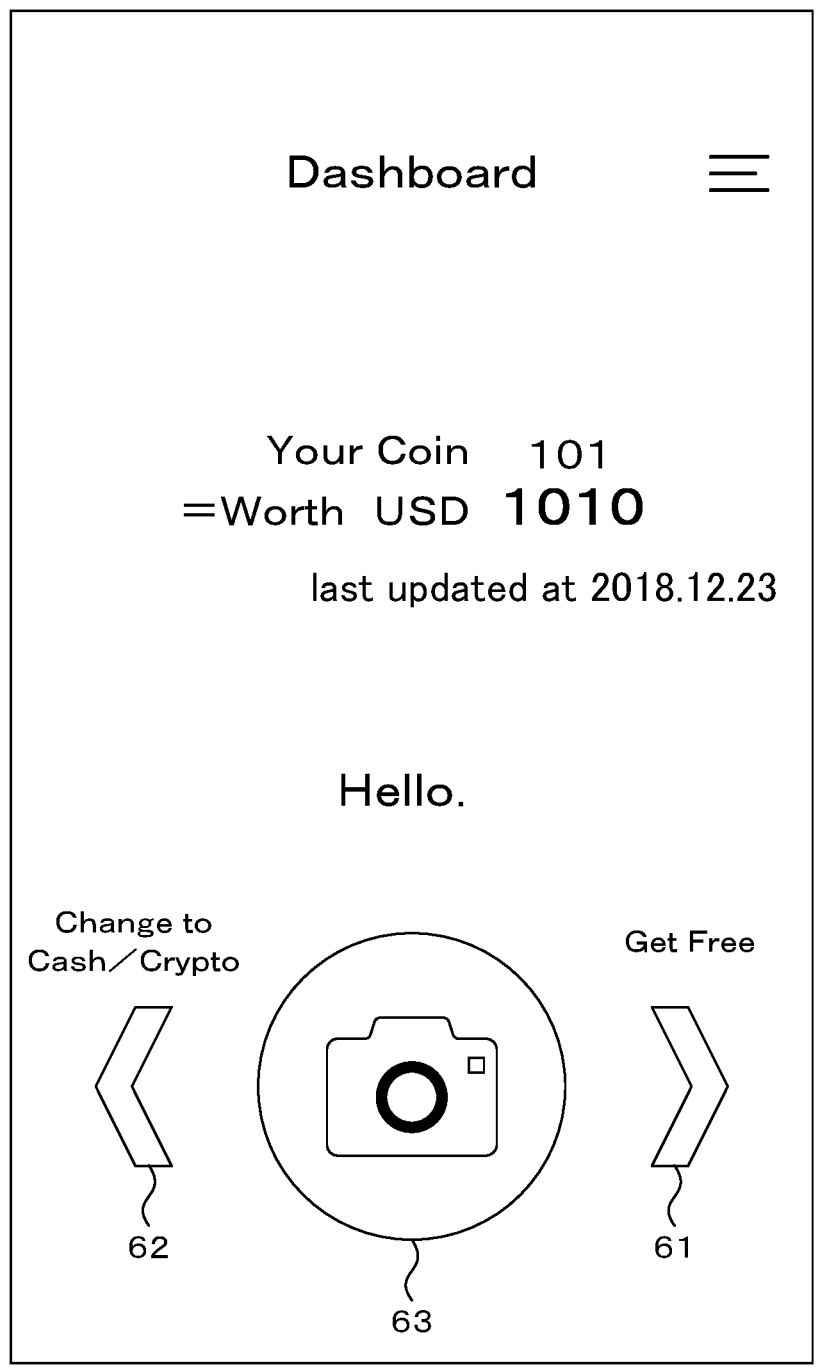
FIG. 9 is an explanatory view showing a top screen after token provision.

FIG. 9 is an explanatory view showing a top screen after token provision. When posting is completed, the terminal 2 returns to the top screen also shown in FIG. 6. In this case, the terminal 2 updates the top screen to display the token holding quantity after the provision. That is, the terminal 2 adds the quantity of tokens provided in the above to the previous holding quantity to update the holding quantity to the one after the addition, and displays the updated quantity. Thereby, the user can immediately confirm that tokenback has been received by the purchase of the commodity or the like.

In this case, for example, it is preferable for the terminal 2 to display the holding quantity displayed on the top screen, in a mode different from that in which the holding quantity before provision shown in FIG. 6 is displayed, by changing the display color or the like in order that the user can intuitively grasp that the holding quantity has been increased. In FIG. 9, for convenience sake, the condition where the display color has been changed is shown by the thick letters.

Figure 10:
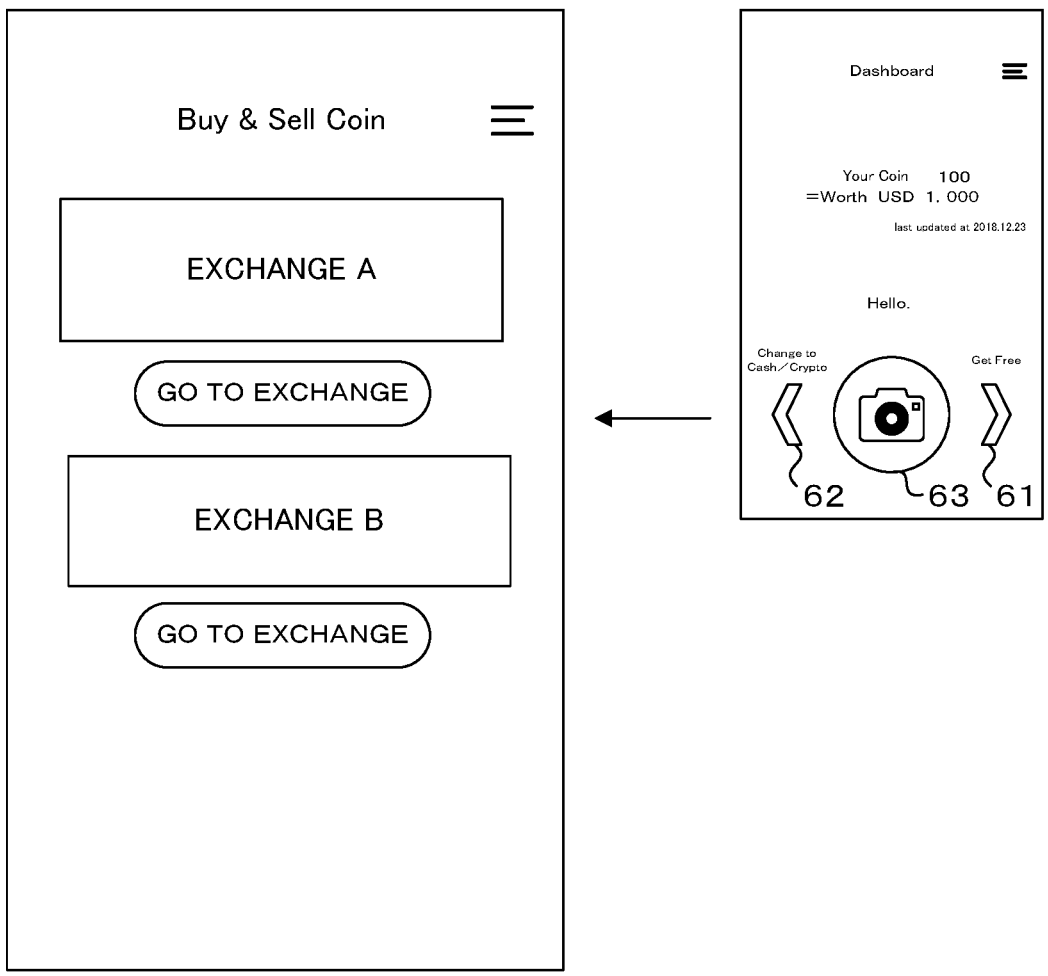
FIG. 10 is an explanatory view showing an example of a screen shift at the time of a right swipe operation.

FIG. 10 is an explanatory view showing an example of a screen shift at the time of a right swipe operation. When a swipe operation of swiping from the left to the right (second direction) according to the right swipe icon 62 is accepted on the top screen, the terminal 2 displays a link screen (third screen) shown in FIG. 10. The link screen is a screen to list a plurality of exchanges where tokens can be bought and sold, and is a link page for accessing the sites of the exchanges. The terminal 2 accepts a selection input to select any of the exchanges on the link screen, and accesses the site of the selected exchange. The terminal 2 can change the tokens into the legal currency or another virtual currency at the accessed site (not shown) of the exchange. Moreover, the terminal 2 can make an additional purchase of tokens at the exchange.

While only a shift to the site of the exchange is made in the example of FIG. 10, the present embodiment is not limited thereto. For example, it may be made possible for the terminal 2 to accept a specification input to specify the account of the exchange to which the tokens are to be sent and the quantity of tokens to be sent on the screen of FIG. 10 and send the tokens to the specified account (wallet). This enables the user to move tokens with a simple operation.

Moreover, when an exchange selection input is accepted on the link screen, the terminal 2 may provide a predetermined alert display to prompt the user to reconsider the change of the tokens. Thereby, it is possible to encourage the user to continuously hold tokens.

As described above, by purchasing commodities or the like at member shops, users can obtain tokens expected to increase in price. In particular, in the present embodiment, tokens can be obtained with a simple operation on the terminal 2.

Figure 11:
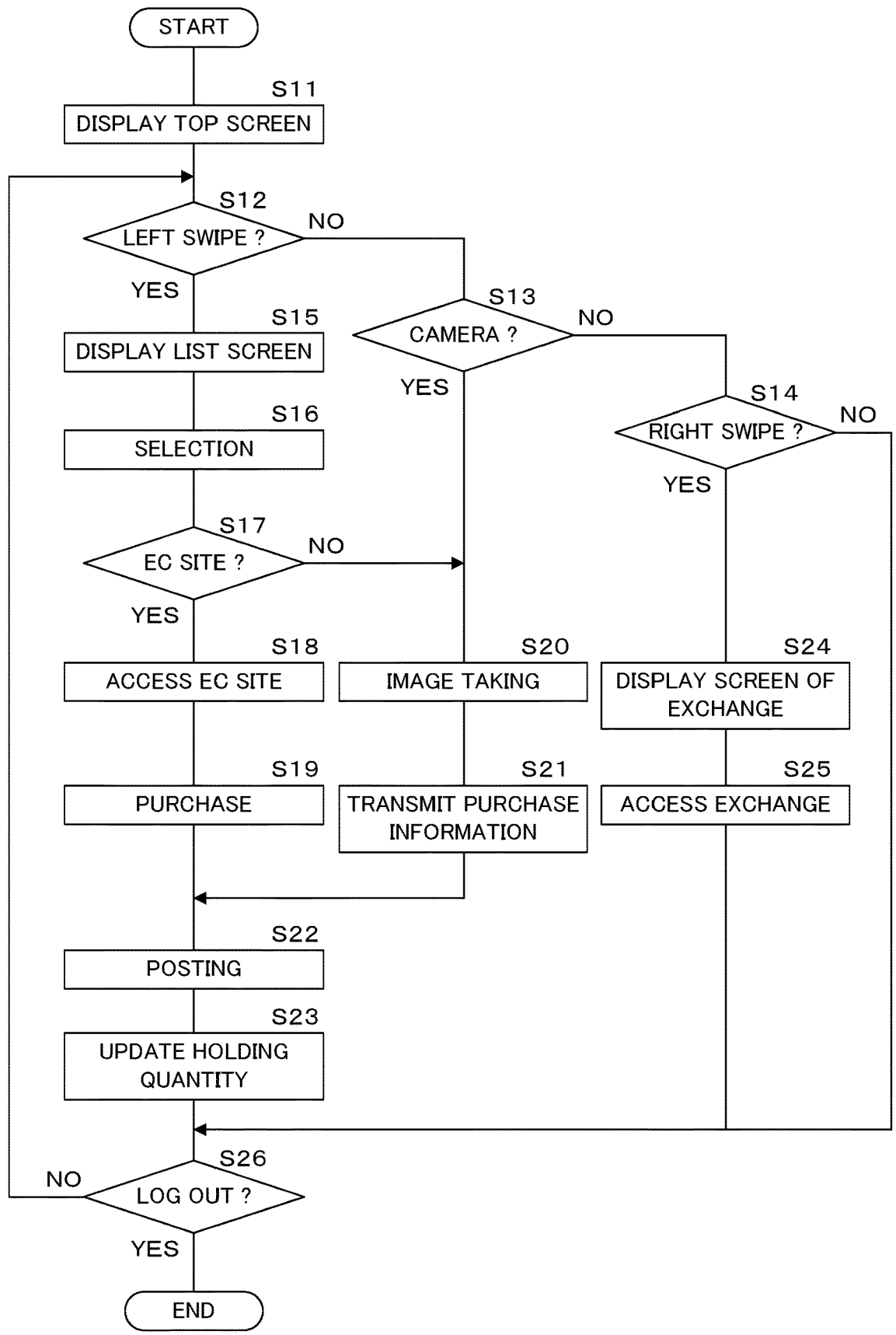
FIG. 11 is a flowchart showing an example of the processing procedure executed by the terminal.

FIG. 11 is a flowchart showing an example of the processing procedure executed by the terminal 2. Based on FIG. 11, the contents of the processing executed by the terminal 2 will be described. The control portion 21 of the terminal 2 displays the top screen (first screen) showing the holding quantity of the tokens (virtual currency) currently held by the user (step S11). The control portion 21 determines whether an operation input of left swipe of swiping left (first direction) has been accepted or not on the top screen (step S12). When determining that no left swipe operation input has been accepted (S12: NO), the control portion 21 determines whether an operation input to the camera icon 63 has been accepted or not (step S13). When determining that no operation input to the camera icon 63 has been accepted (S13: NO), the control portion 21 determines whether an operation input of right swipe of swiping right (second direction) has been accepted or not (step S14).

When determining that a left swipe operation input has been accepted (S12: YES), the control portion 21 displays the list screen (second screen) listing the member shops (step S15). Specifically, the control portion 21 displays one or more EC site (virtual shop) member shops (first member shops) and one or more real shop member shops (second member shops). The control portion 21 accepts a selection input to select any of the member shops displayed on the list screen (step S16).

The control portion 21 determines whether an EC site has been selected at step S16 or not (step S17). When determining that an EC site has been selected (S17: YES), the control portion 21 accesses the selected EC site (step S18). The control portion 21 performs processing related to the application for purchase of a commodity or the like at the EC site based on an operation input from the user (step S19). When the user purchases a commodity or the like at the EC site, the server 1 obtains purchase information on the commodity or the like purchased by the user from the EC server 4.

In the case of YES at step S13 or NO at step S17, the control portion 21 shifts to the image taking mode to take an image of a receipt (medium) describing the information on the purchase by the user at a real shop, and takes an image of the receipt according to an operation input from the user (step S20). The control portion 21 extracts the purchase information from the taken image, and transmits it to the server 1 (step S21).

After executing the processing of step S19 or S21, the control portion 21 obtains a notification related to the quantity of tokens to be provided from the server 1, shifts to the notification screen (fourth screen) for making a token donation and a posting to an SNS, and outputs posting information onto the SNS based on an operation input from the user (step S22). The screen displayed at step S22 is a screen to prompt the user to donate tokens and make a posting indicating that donation has been made, to an SNS, and displays, for example, information (image, etc.) on the recipient decided on by the server 1 in addition to the quantity of tokens to be provided. The control portion 21 accepts input of arbitrary text from the user, and outputs posting information including the inputted text and an image of the recipient, and the like onto the SNS.

When the posting information from the user is outputted to the SNS, the server 1 provides the quantity of tokens corresponding to the purchase amount or the like. Moreover, the server 1 sends some of the tokens provided to the user, to the recipient. The control portion 21 shifts to the top screen, and updates the token holding quantity displayed on the top screen to the token holding quantity after the provision (step S23).

When determining that a right swipe operation input has been accepted on the top screen (S14: YES), the control portion 21 displays the link screen (third screen) listing the exchanges where tokens can be bought and sold (step S24). The control portion 21 accepts a selection input to select the exchange to be accessed, and accesses the selected exchange (step S25).

After executing the processing of S23 or S25 or in the case of NO at step S14, the control portion 21 determines whether to log out or not according to an operation input from the user (step S26). When determining not to log out (S26: NO), the control portion 21 returns the process to step S12 (S26: YES). When determining to log out (S26: YES), the control portion 21 ends the series of processing.

Figure 12:
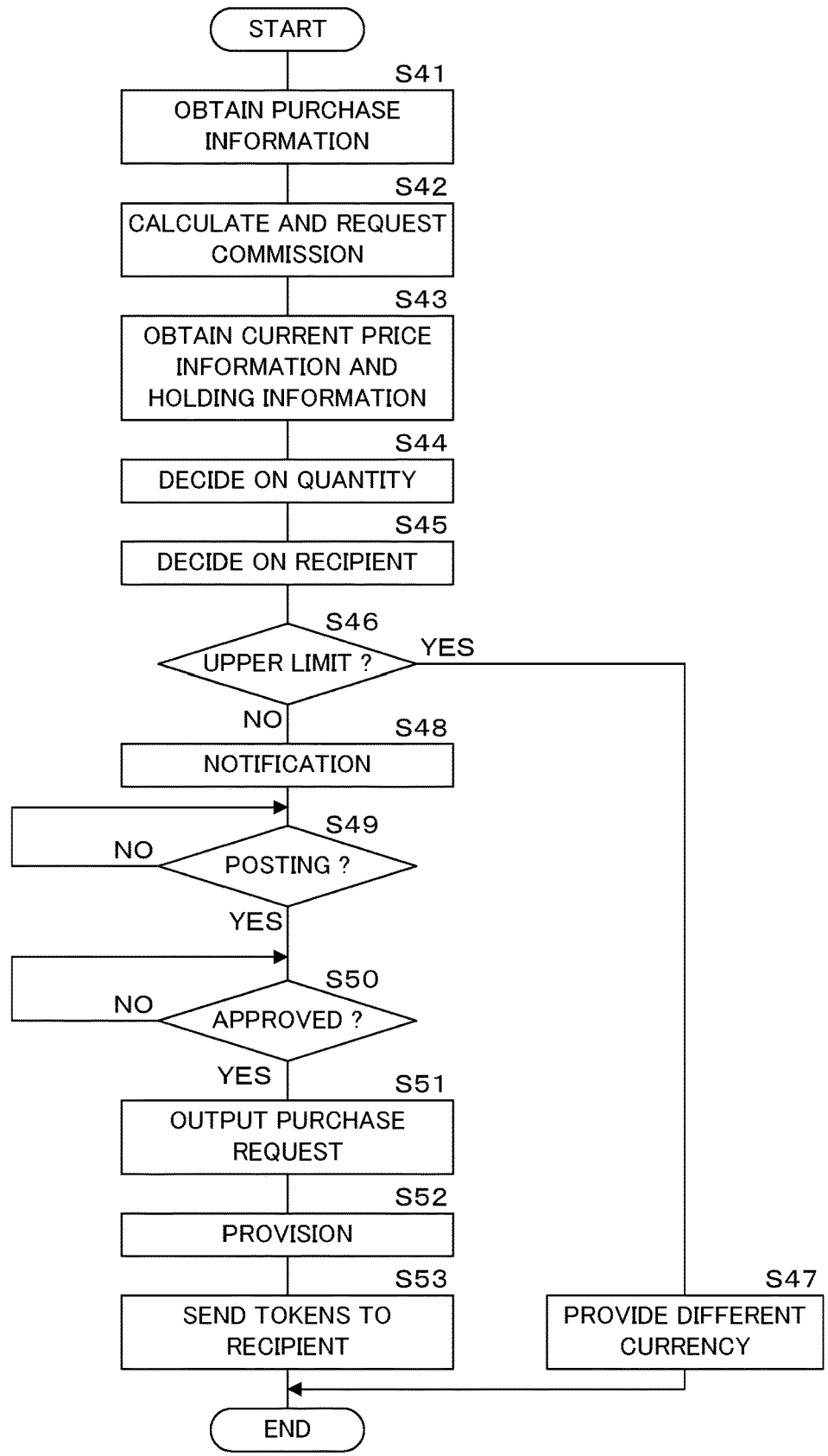
FIG. 12 is a flowchart showing an example of the processing procedure executed by the server.

FIG. 12 is a flowchart showing an example of the processing procedure executed by the server 1. Based on FIG. 12, the contents of the processing executed by the server 1 will be described. The control portion 11 of the server 1 obtains purchase information on the commodity or the like purchased by the user from the terminal 2 or the EC server 4 (step S41). The control portion 11 reads the commission rate of the member shop from the member shop DB 142 to calculate the commission corresponding to the purchase amount of the commodity or the like, and requests the member shop to pay the commission (step S42).

The control portion 11 obtains the information on the current price of the token (virtual currency) at the trading market and the information on the token holding by the user (step S43). The current price information is data representative of the current price (the equivalent amount in legal currency) of the token, and is data representative of the market price at the virtual currency trading market (exchange, etc.). The holding information is data representative of the user's token holding condition, and is, for example, data representative of token holding quantity and holding period.

The control portion 11 decides on the quantity of tokens to be provided to the user based on the purchase information, the current price information, the holding information and the like (step S44). Specifically, the control portion 11 converts the commission (price in legal currency) obtained by multiplying the purchase amount of the commodity or the like by the commission rate of the member shop, into the quantity of tokens according to the current price of the tokens. Moreover, the control portion 11 performs weighting according to the user's holding information, and decides on the provision quantity so that the larger the holding quantity and the longer the holding period, the larger the provision quantity is.

Moreover, the control portion 11 decides on the recipient to which some of the tokens to be provided to the user is sent (step S45). For example, the control portion 11 decides on the recipient from the user's history of purchase of commodities or the like.

The control portion 11 obtains information on the current token issuance quantity from the issuing server 5, and determines whether the upper limit of token issuance is reached or not (step S46). When determining that it reaches the upper limit of issuance (S46: YES), the control portion 11 provides the user with another virtual currency different from the token of the present system or the legal currency (step S47), and ends the series of processing.

When determining that the upper limit of issuance is not reached (S46: NO), the control portion 11 notifies the terminal 2 of the quantity of tokens to be provided decided on at step S44 (step S48). Specifically, the control portion 11 notifies the terminal 2 of the quantity of tokens to be provided and the information on the recipient decided on at step S45.

The control portion 11 determines whether posting to an SNS by the user has been completed or not (step S49). When determining that posting has not been completed (S49: NO), the control portion 11 becomes on standby for processing. When determining that posting has been completed (S49: YES), the control portion 11 determines whether approval of token provision has been accepted from the member shop or not (Step S50). When determining no approval of token provision has been accepted (S50: NO), the control portion 11 becomes on standby for processing.

When determining that approval of token provision has been accepted (S50: YES), the control portion 11 outputs a token purchase request based on the commission calculated at step S42, to the exchange server 3 (step S51). Moreover, the control portion 11 provides the user with tokens excluding tokens to be donated (step S52). Moreover, the control portion 11 sends the tokens to be donated, to the recipient decided on at step S45 (step S53), and ends the series of processing.

While the quantity of tokens provided to the user is determined according to the commission paid from the member shop in the present embodiment, tokenback may be performed while the quantity of tokens provided to the user is determined irrespective of the quantity of the commission.

While token buyback is performed through an exchange in the present embodiment, buyback through an exchange is not essential but the server 1 may purchase tokens directly from a token holder.

While tokens are provided according to the information on the purchase of a commodity or the like by the user in the above, the present embodiment is not limited thereto. For example, the server 1 may provide tokens by using, as a trigger, the user's action other than the purchase of a commodity or the like such as access to an Internet advertisement by the user or use of a specific application. That is, the purchase of a commodity or the like is an example of the trigger of token provision, and tokens may be provided in response to the user's different action.

From the above, according to Embodiment 1, the terminal 2 shifts to the member shop list screen by a simple swipe operation on the top screen, outputs purchase information to the server 1 directly by receipt reading or the like or indirectly by way of the EC server 4, receives token provision and presents, to the user, the holding quantity after the provision. As described above, tokenback can be received with a simple operation, so that consumers (users) can be appropriately assisted.

Moreover, according to Embodiment 1, buying and selling of tokens can be performed by accessing an exchange with a simple swipe operation on the top screen.

Moreover, according to Embodiment 1, tokenback can be received in accordance with both member shops which are EC sites (virtual shops) and member shops which are real shops.

Moreover, according to Embodiment 1, the present system can be implemented as a measure for social contribution by making token donation a condition of tokenback.

Moreover, according to Embodiment 1, the present system can be made known to general consumers by making posting to an SNS a condition of tokenback.

Embodiment 2

In the present embodiment, a mode will be described in which machine learning of learning the user's purchase history and the like is performed to generate an estimation model 147 and the purchase action of the user using member shops is estimated by using the generated estimation model 147. Contents overlapping those of Embodiment 1 are denoted by the same reference signs and descriptions thereof are omitted.

Figure 13:
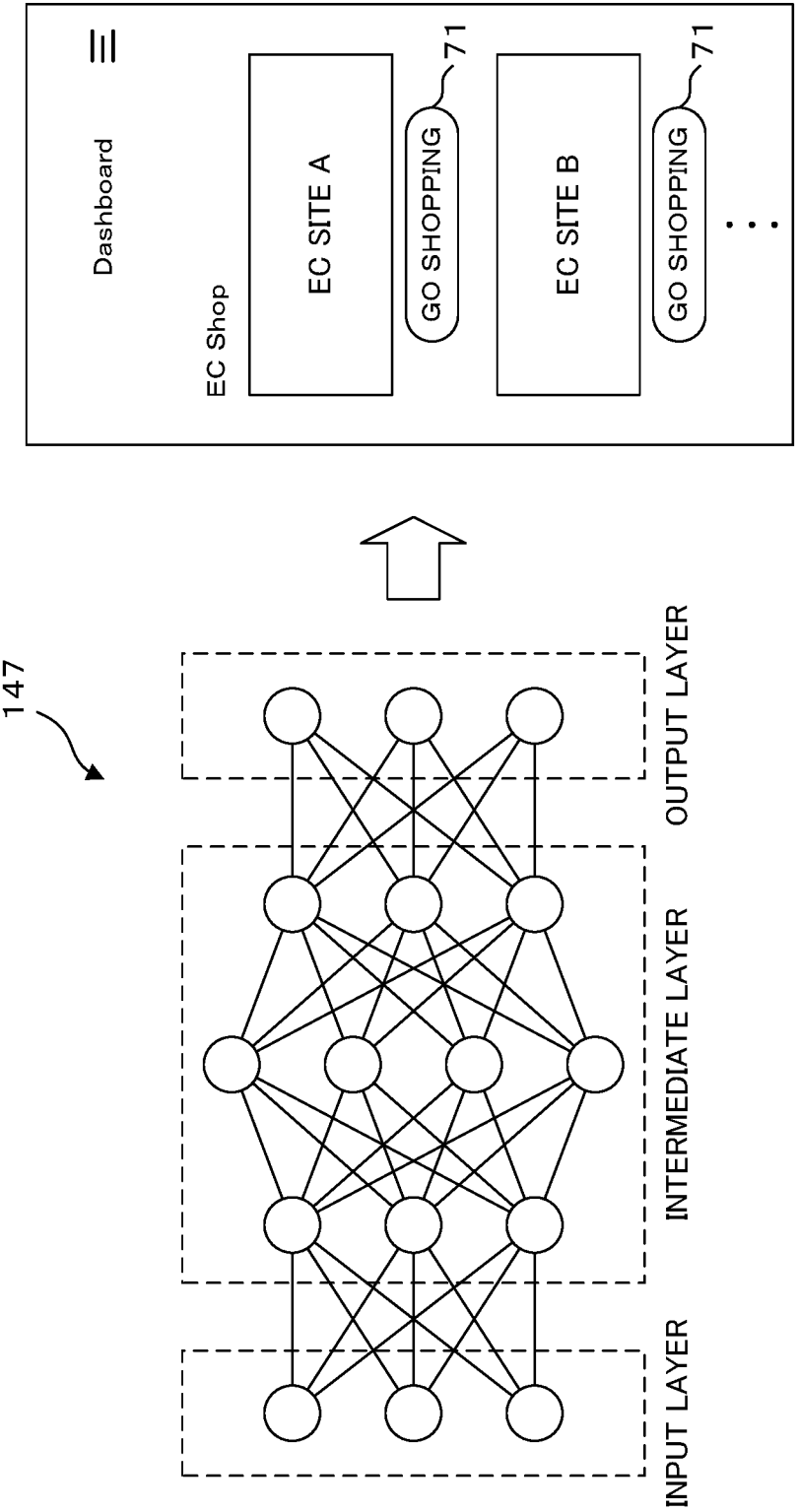
FIG. 13 is an explanatory view related to an estimation model.

FIG. 13 is an explanatory view related to the estimation model 147. In the present embodiment, the server 1 performs machine learning of learning the history of posting to an SNS by the user, the user's individual information and the like in addition to the history of purchase of commodities or the like by the user, and generates the estimation model 147. Then, the server 1 estimates the user's purchase action by using the estimation model 147, and presents information according to the estimation result to the user. For example, the server 1 changes the display order of the member shops displayed on the list screen illustrated in FIG. 7 based on the estimation result outputted from the estimation model 147, and member shops more possibly used by each user are displayed in higher places.

While the following description is given on the assumption that the estimation is performed with respect to EC sites (virtual shops), the target of estimation for the estimation model 147 is not only EC sites but may include member shops which are real shops.

The estimation model 147 is a neural network generated by deep learning, and is, for example, RNN (Recurrent Neural Network). The estimation model 147 has an input layer that accepts data input, an intermediate layer that performs calculation based on the data inputted to the input layer, and an output layer that outputs data for output based on the calculation result at the intermediate layer.

The input layer has a plurality of neurons that accept input of various kinds of data, and hands over the inputted data to the intermediate layer. The intermediate layer has a plurality of neurons that perform calculation based on the data obtained from the input layer, and performs calculation processing to extract the feature scores of the input data. For example, when the estimation model 147 is RNN, the intermediate layer performs calculation by using the calculation results of chronologically arranged front and back neurons, thereby extracting the feature scores in consideration of the correlation between the pieces of data inputted to the neurons of the input layer. The output layer estimates the data to be outputted, based on the feature scores extracted at the intermediate layer.

While RNN is cited as an example of the estimation model 147 in the above, the estimation model 147 may be a different neural network. Moreover, the estimation model 147 is not limited to a learnt model related to deep learning; for example, it may be a model based on an algorithm such as reinforcement learning, decision tree, random forest or SVM (Support Vector Machine).

In the present embodiment, the server 1 generates the estimation model 147 to estimate the purchase action of the user using member shops, based on the user's purchase history, posting history, individual information and the like by using, as the teacher data, information stored in the purchase history DB 144, the posting history DB 145 and the like.

Specifically, with the purchase history and the like as the input, the server 1 generates the estimation model 147 the output of which is an EC site (member shop) to be recommended to the user. More specifically, the server 1 generates the estimation model 147 that outputs the priority order of the EC sites to be recommended to the user with respect to a plurality of EC sites joining the present system.

The server 1 reads, from the databases, the history of posting information on posting to an SNS as a condition of tokenback (data such as the posted comments and the posting date) and each user's individual information (data such as the age, sex and nationality) in addition to each user's purchase history (data such as the purchased commodity or the like, the purchase amount and the purchase date), and inputs them to the estimation model 147 as the input data for the teacher. The server 1 performs calculation at the estimation model 147 based on various kinds of data, and estimates the member shops to be recommended to the user, specifically, the priority order of the member shops to be recommended (for example, the probability value corresponding to each EC site).

In this case, for example, with reference to each user's purchase history, the server 1 performs learning by using, as the evaluation functions, the purchase amount of commodities or the like purchased by the user at each EC site and the purchase frequency with which commodities or the like are purchased at each EC site. For example, the server 1 calculates the value obtained by multiplying the purchase amount by the purchase frequency for each EC site, and determines the correct answer value of the priority order of the EC sites so that the higher the multiplication value is, the higher the priority order is. The server 1 compares the priority order estimated based on the input data with the priority order as the correct answer, and in order that these are approximate to each other, the server 1 optimizes various parameters (weight, etc.) used at the intermediate layer. Thereby, the server 1 generates the estimation model 147 to estimate an EC site with a high purchase amount and a high purchase frequency.

It is preferable for the server 1 to add the commission of each EC site (member shop) to the evaluation functions in addition to the purchase amount and the purchase frequency at the time of the above-described learning. Specifically, the server 1 multiplies the commission paid from each EC site in addition to the purchase amount and the purchase frequency, and determines the correct answer value of the priority order according to the multiplication of the purchase amount, the purchase frequency and the commission. Thereby, EC sites paying higher commissions to the present system are given higher priority, so that the service associated with tokenback can be suitably maintained.

The server 1 inputs data such as each user's purchase history, posting history and individual information to the estimation model 147 generated in the above, and estimates the EC site to be recommended to each user. Then, the server 1 presents the estimated EC site to the user.

For example, when the terminal 2 displays the member shop list screen illustrated in FIG. 7, the server 1 estimates the priority order of the EC sites by using the estimation model 147, and outputs a list screen displaying the EC sites according to the estimated priority order. For example, the server 1 may estimate the priority order by batch processing and perform output according to the estimated priority order when a list screen is displayed. The terminal 2 displays EC sites with higher priority order from the top of the screen according to the output from the server 1. Specifically, as in Embodiment 1, the terminal 2 displays the EC sites and the link buttons 71 (ink information) for accessing the EC sites. When an operation input to the link button 71 corresponding to each EC site is accepted, the terminal 2 accesses the EC site and the user can purchase a commodity or the like.

By the above-described processing, EC sites with high priority, that is, EC sites frequently used by the user and with a high used amount (purchase amount) are presented. In addition, the user can easily access the EC sites by an operation on the link button 71, so that user convenience can be improved.

Figure 14:
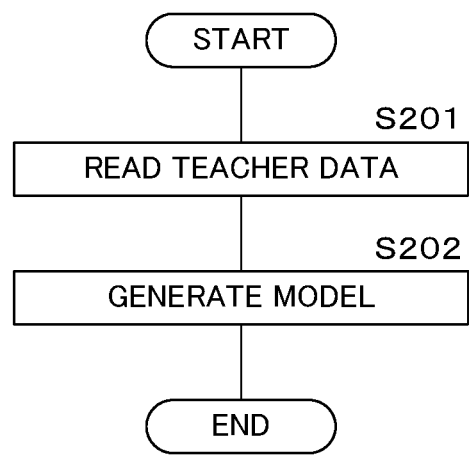
FIG. 14 is a flowchart showing the procedure of the processing of generating the estimation model.

FIG. 14 is a flowchart showing the procedure of the processing of generating the estimation model 147. Based on FIG. 14, the contents of the processing of generating the estimation model 147 by machine learning will be described. The control portion 11 of the server 1 reads information such as each user's individual information, history of purchase of commodities or the like and history of posting to an SNS as teacher data from the databases (step S201). The purchase history includes the member IDs of the member shops where the user purchased commodities or the like in addition to the commodities or the like (commodities or services) purchased by the user.

When the data such as the purchase history is inputted, the control portion 11 generates the estimation model 147 that outputs the purchase actions of the user using the member shops by using the teacher data (step S202). Specifically, with the purchase history and the like as input, the control portion 11 generates the estimation model 147 that outputs the member shops estimated to be used by the user. The control portion 11 inputs data such as the purchase history, the posting history and the individual information for the teacher, to the estimation model 147, and estimates the member shops used by the user. The control portion 11 compares the estimated member shops with the member shops determined to be recommended according to the purchase amount, the purchase frequency, the commission and the like, optimizes various kinds of parameters of the intermediate layer in order that these are approximate to each other, and generates the estimation model 147. The control portion 11 ends the series of processing.

Figure 15:
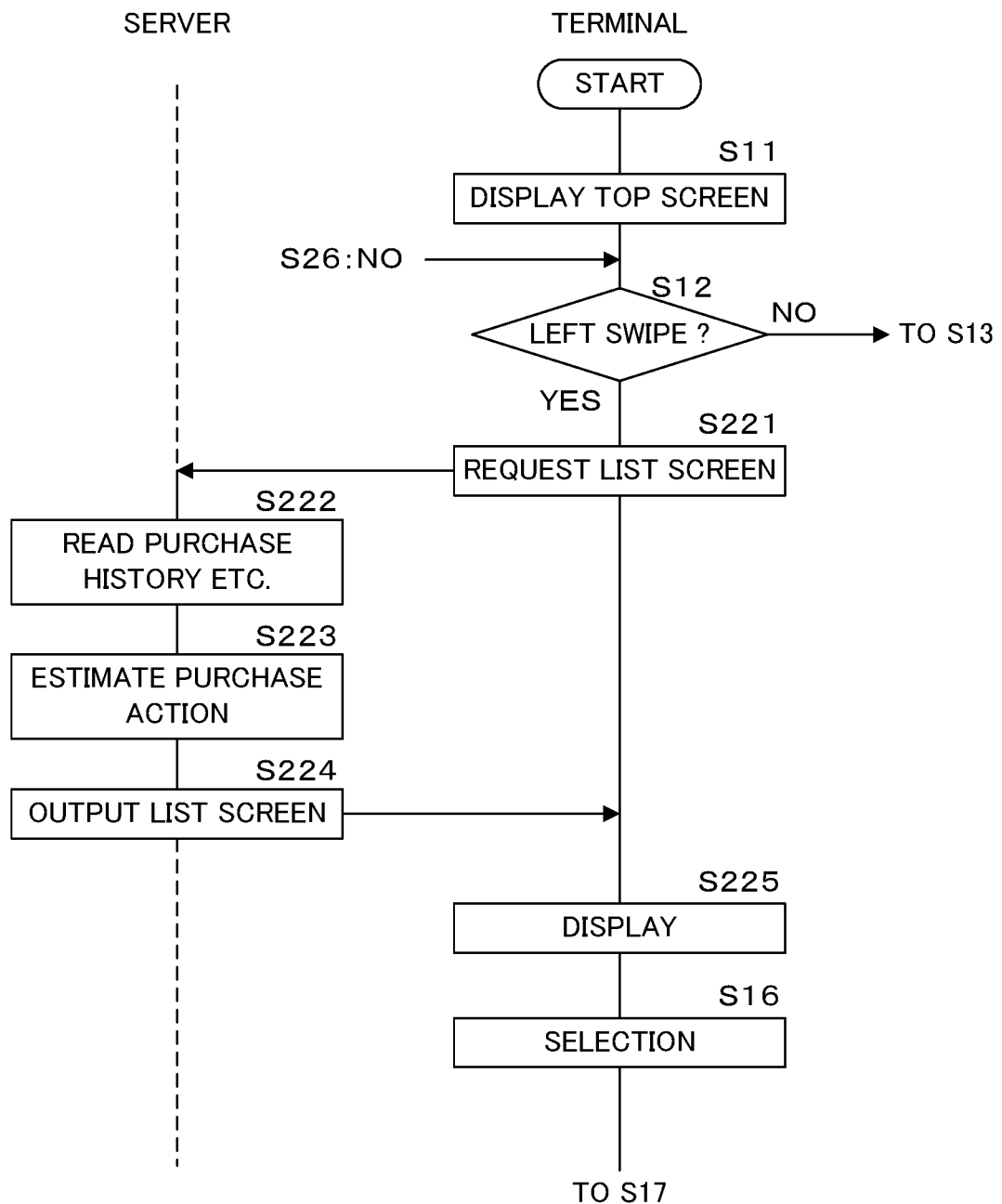
FIG. 15 is a flowchart showing an example of the processing procedure executed by a tokenback system according to Embodiment 2.

FIG. 15 is a flowchart showing an example of the processing procedure executed by the tokenback system according to Embodiment 2. When an operation input of a left swipe is accepted on the top screen (S12: YES), the terminal 2 executes the following processing. The control portion 21 of the terminal 2 requests the server 1 to output a member shop list screen (step S221). When a list screen output request is accepted, the control portion 11 of the server 1 reads, from the databases, data such as the history of purchase of commodities or the like, the history of posting to an SNS and the individual information of the target user (step S222).

The control portion 11 inputs the read data to the estimation model 147, and estimates the target user's purchase action (step S223). Specifically, the control portion 11 obtains, as the output, the member shops (EC sites) estimated to be used by the user. Specifically, with respect to a plurality of member shops, the control portion 11 obtains the priority order of the member shops to be recommended to the user. The control portion 11 outputs, to the terminal 2, a list screen displaying the member shops according to the obtained priority order (step S224). The control portion 21 of the terminal 2 displays the outputted list screen (step S225), and shifts the process to step S16.

While only the links to the EC sites (member shops) are presented in the above, for example, the server 1 may estimate the commodities or the like highly probably purchased by the user by using the estimation model 147 and present (output) the links to the pages of the EC sites where the estimated commodities or the like are shown. For example, the server 1 stores, in the member shop DB 142, the commodities or the like provided by the EC sites and the pages in the EC sites showing the commodities or the like in association with each other, and estimates the priority order of the commodities or the like to be recommended to the user by using the estimation model 147. According to the estimated priority order, the server 1 displays the information on the commodities or the like from the top of the list screen, and displays the link buttons 71 (link information) for accessing the pages of the commodities or the like. Thereby, the user convenience can be further improved.

From the above, according to Embodiment 2, the purchase action of the user using the member shops is estimated by using the estimation model 147 and information according to the estimation result is outputted to the user, whereby the consumer (user) can be suitably assisted.

Moreover, according to Embodiment 2, the EC sites (virtual shops) to be recommended to the user are estimated, and link information to access the estimated EC sites is outputted. Thereby, the user convenience can be improved.

Moreover, according to Embodiment 2, the priority order of the EC sites to be recommended to the user is estimated and the EC sites are presented according to the estimated priority order, whereby the user convenience can be further improved.

Moreover, according to Embodiment 2, the member shops where the purchase amount, the purchase frequency and the commission are maximized are presented, whereby the user can be more suitably assisted.

Moreover, according to Embodiment 2, by using the history of posting to an SNS as input in addition to the purchase history, not only the user's purchase action at the member shops but also the behavior (action) on the SNS can be learned, so that the accuracy of purchase action estimation can be improved.

Embodiment 3

Figure 16:
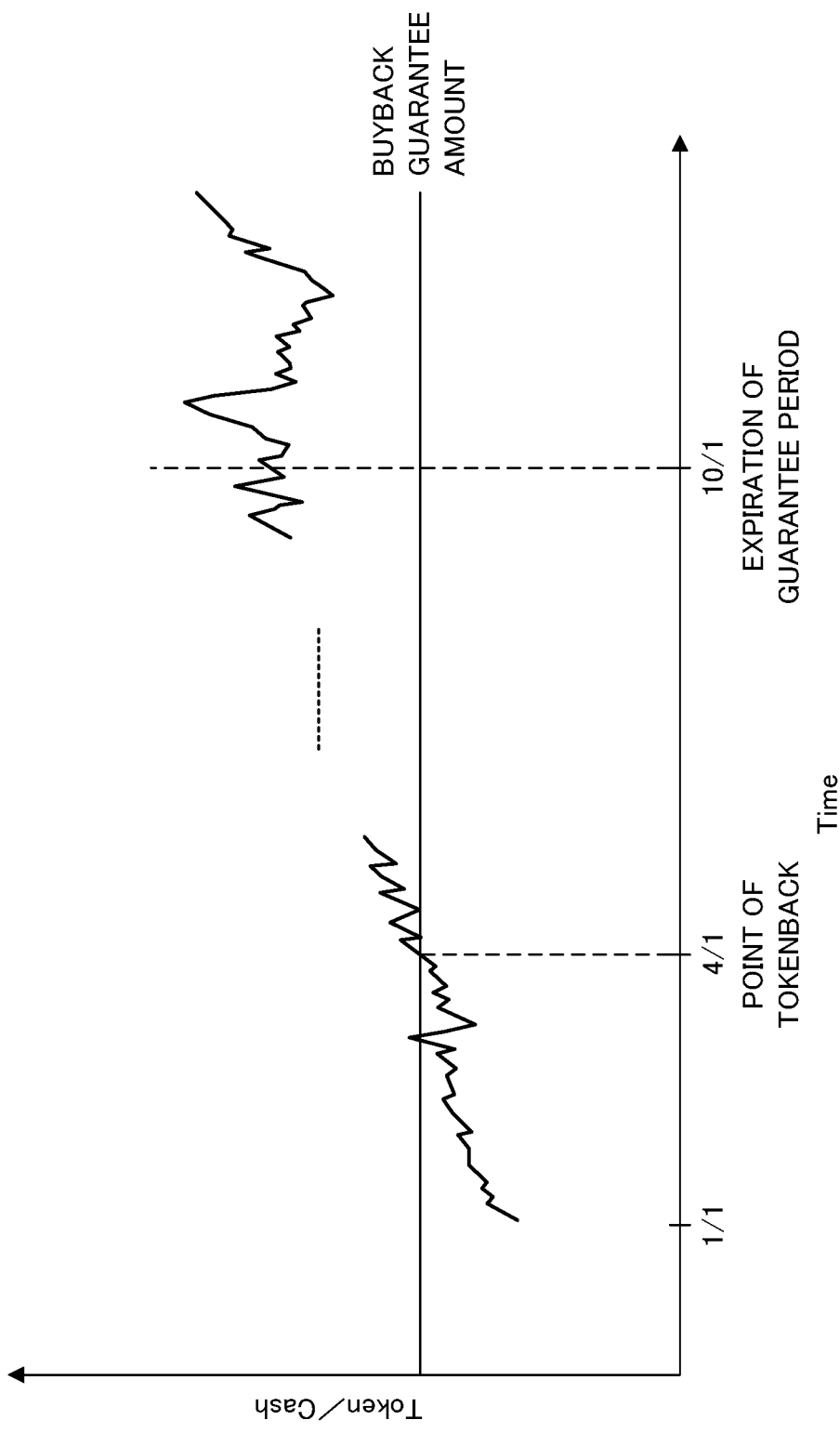
FIG. 16 is an explanatory view showing an outline of Embodiment 3.

In the present embodiment, a mode will be described in which buyback guarantee is provided for a predetermined period for the tokens provided to the user. FIG. 16 is an explanatory view showing an outline of Embodiment 3. Based on FIG. 16, the output of the present embodiment will be described.

In Embodiment 1, without the tokens according to the present system being aimed at consumption, tokens are procured from the market based on the commissions from the member shops, and tokens are provided according to the users' holding information, thereby encouraging long-time holding and creating demands for tokens to enhance the value. In the present embodiment, further, the user is provided with buyback guarantee such that for the provided tokens, during a predetermined buyback guarantee period, tokens are bought back with a predetermined buyback amount (exchange amount). Thereby, long-time holding of tokens is further encouraged to relatively increase the value of the tokens.

For example, the server 1 accepts a request to exchange the provided tokens for the legal currency, from each user's terminal 2. Specifically, the server 1 accepts a specification input to specify the quantity of tokens to be exchanged. The server 1 may accept an exchange request input not from the terminal 2 but, for example, manually from an operator having received an inquiry from the user.

When an exchange request is accepted, the server 1 identifies the point of time of provision of the tokens having been provided to the user. For example, with reference to the provision history DB 146, the server 1 identifies the transaction of the tokens having been approved by the member shop and not having undergone exchange based on the buyback guarantee in the past. Then, the server 1 identifies the point of time of token provision (for example, the point of time when approval is accepted from the member shop) by each transaction. The server 1 determines whether the point of time of token provision by each transaction is within a predetermined period from the present time (point of time when the exchange request is accepted) or not.

For example, the server 1 extracts a user-specified quantity of tokens in order from the tokens whose provision points of time are earlier among the tokens determined to be within the predetermined period. The server 1 makes the extracted tokens the target of exchange. For example, the server 1 may output the transactions of the tokens determined to be within the predetermined period in the form of a list to the terminal 2 and make the user select the transaction to be the target of exchange.

The server 1 obtains the information on the current price of the tokens, and calculates the exchange amount (buyback guarantee amount) of the tokens. For example, the server 1 obtains the current price information at the point of time of token provision so that the price is the same as that at the point of time when the tokens were provided, and calculates the amount obtained by converting the tokens into the legal currency according to the current price at the point of time of provision.

While tokens are bought back at the same price as that at the point of time of token provision in the present embodiment, the exchange amount is not necessarily the same as the price at the point of time of provision. For example, the server 1 may make the exchange amount the price less than that at the point of time of provision (for example, 90% of the amount) in order to further encourage long-time holding. Moreover, since a commission or the like occurs at the exchange at the time of token buyback, the amount obtained by subtracting the commission may be made the exchange amount.

The server 1 notifies the terminal 2 of the exchange amount, and accepts an approval input from the terminal 2 as to whether to approve exchange with the exchange amount or not. When the exchange amount is approved, the server 1 notifies the wallet address as the destination of token sending, and prompts the user to send the specified tokens. After confirming sending of the tokens from the user, the server 1 performs processing related to the sending of the legal currency corresponding to the exchange amount (for example, request for sending to a financial institution). This completes the token buyback.

When the exchange amount is notified to the user in the above, preferably, not only the exchange amount merely based on buyback guarantee is presented but also the market price of the tokens at the present time, that is, the exchange amount when the tokens are exchanged at the trading market (second exchange amount) is calculated and the difference therebetween is presented to the user.

That is, the server 1 obtains the information on the current price of the tokens at the present time (the point of time when an exchange request is accepted) from the exchange server 3, and calculates the exchange amount obtained by converting the tokens into the legal currency according to the current price at the present time. Explaining according to the example of FIG. 16, when the point of time of provision is April 1, the amount obtained by converting the tokens with the current price at the present time when the exchange request is accepted (for example, as of October 1 which is the expiration date) is calculated separately from the exchange amount calculated with the current price of April 1. For example, the server 1 notifies the terminal 2 of the amounts of both and of the difference in amount (difference) therebetween, and presents it to the user. Thereby, the user can suitably determine whether to perform exchange (buyback) based on buyback guarantee or not.

Figure 17:
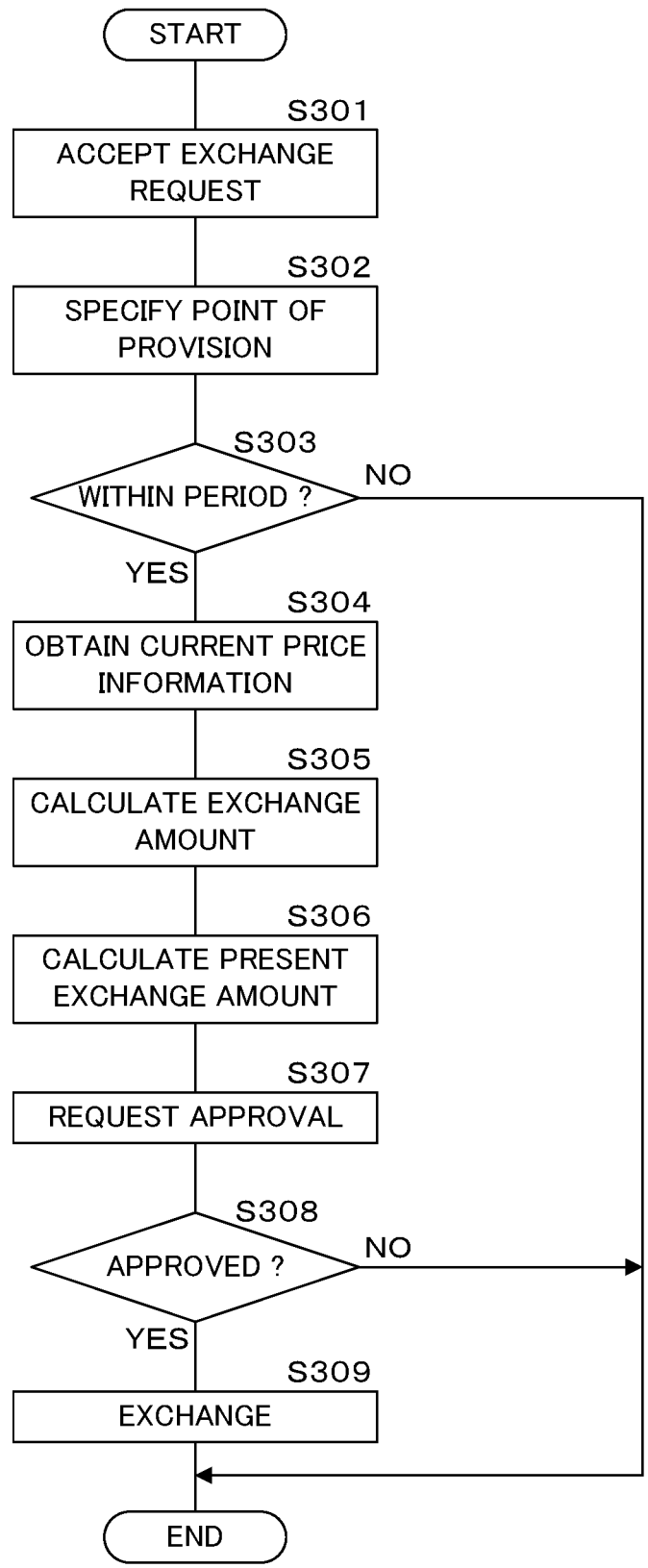
FIG. 17 is a flowchart showing an example of the processing procedure executed by a tokenback system according to Embodiment 3.

FIG. 17 is a flowchart showing an example of the processing procedure executed by the tokenback system according to Embodiment 3. The control portion 11 of the server 1 accepts a token exchange request from the terminal 2 (step S301). When an exchange request is accepted, the control portion 11 identifies the point of time of provision of the tokens having been provided to the user (step S302).

The control portion 11 determines whether or not the point of time when the exchange request is accepted at step S301 is within a predetermined period from the point of time of token provision identified at step S302 (step S303). When determining that it is not within the predetermined period (S303: NO), the control portion 11 ends the series of processing. When determining that it is within the predetermined period (S303:YES), the control portion 11 obtains the information on the current price of the tokens (step S304). For example, the control portion 11 obtains the current price information at the point of time of token provision and the present time (the point of time when the exchange request is accepted).

Based on the obtained current price information, the control portion 11 calculates the token exchange amount according to the current price at the point of time of provision (step S305). Moreover, the control portion 11 calculates the exchange amount obtained by converting the tokens into the legal currency according to the current price at the present time (second exchange amount) (step S306). The control portion 11 requests for approval of token exchange (step S307). For example, the control portion 11 outputs the token exchange amount based on the current price at the point of time of provision and outputs the exchange amount based on the current price at the present time, and presents the difference therebetween to the user. After presenting these two amounts, the control portion 11 accepts a final approval.

The control portion 11 determines whether token exchange has been approved or not (step S308). When determining that it has not been approved (S308: NO), the control portion 11 ends the series of processing. When determining that it has been approved (S308: YES), the control portion 11 performs processing related to token exchange (step S309), and ends the series of processing.

While the buyback guarantee period is a predetermined period and the buyback guarantee amount (exchange amount) is a predetermined amount according to the current price in the description given above, for example, the server 1 may vary the guarantee period and the guarantee amount based on the information on the token holding by the user. For example, when tokens are provided to the user, the server 1 sets the guarantee period and the guarantee amount according to the user's token holding quantity and holding period, and stores the setting contents into the provision history DB 146. For example, the server 1 sets a longer guarantee period and a larger guarantee amount as the holding quantity is larger and the holding period is longer. Thereby, long-time holding of tokens can be further encouraged. When the exchange request has been accepted, the server 1 refers to the setting contents stored in the provision history DB 146, and when it is within the set buyback guarantee period, the server 1 performs exchange with the set buyback guarantee amount.

While tokens are exchanged for the legal currency in the description given above, tokens may be exchanged for, for example, a substitute other than the legal currency such as electronic points or an article. That is, it is necessary only that the tokens provided to the user can be exchanged for a substitute equivalent to the exchange amount according to the current price at the point of time of provision, and the substitute is not limited to the legal currency.

While a predetermined guarantee period is provided for token buyback in the above, it is not always necessary to provide the guarantee period. That is, the buyback guarantee may be provided irrespective of the elapsed time from the point of time of token provision to the point of time when an exchange request is accepted.

While the exchange amount is determined according to the current price at the point of time of provision in the above, tokens may be exchanged with a predetermined exchange amount irrespective of the current price at the point of time of provision.

From the above, according to Embodiment 3, long-time holding of tokens is encouraged to further increase the value.

Moreover, according to Embodiment 3, by presenting the difference between the buyback guarantee amount (exchange amount) and the price at the present time, the user can suitably determine whether to perform exchange or not.

Moreover, according to Embodiment 3, by setting the buyback guarantee period and the buyback amount according to the holding information such as the holding quantity and the holding period, long-time holding of tokens can be more suitably encouraged.

Modification

The buyback guarantee of the virtual currency provided to the user is described in Embodiment 3. In the following, an example of the display when the buyback guarantee amount is displayed on the terminal 2 will be described.

Figure 18:
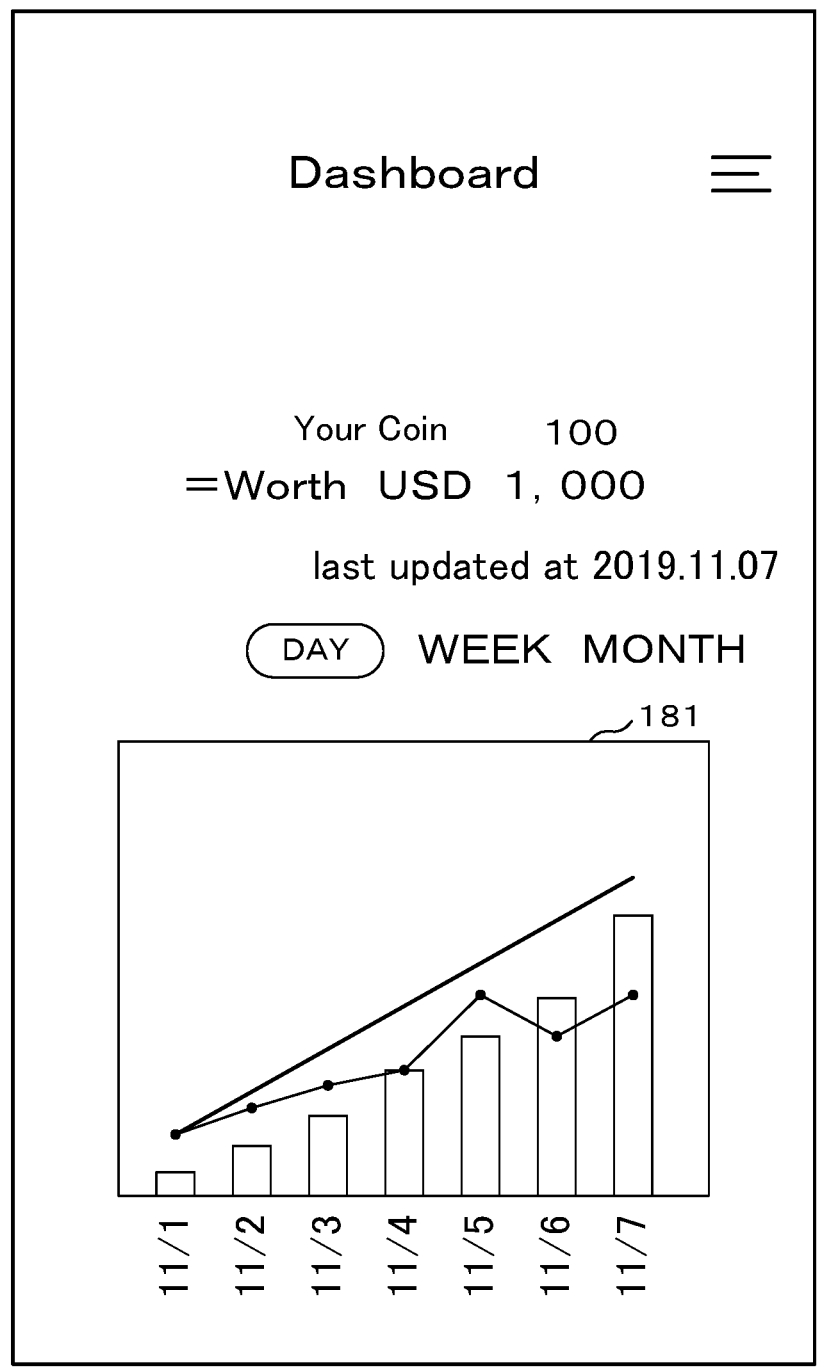
FIG. 18 is an explanatory view showing an example of a top screen according to a modification.

FIG. 18 is an explanatory view showing an example of a top screen according to a modification. The top screen of FIG. 18 includes a graph 181. The graph 181 is a graph chronologically showing the buyback guarantee amount (exchange amount) obtained by converting the tokens held by the user at each point of time in the past according to the current price at the point of time of provision and the exchange amount (second exchange amount) obtained by converting the tokens according to the current price at each point of time. For example, the terminal 2 displays, as vertical bars, the quantity of tokens held by the user at each point of time in the past, and displays, as lines, the buyback guarantee amount obtained by converting the tokens according to the current price at the point of time of provision and the exchange amount obtained by converting the tokens according to the current price at each point of time. In the graph 181 of FIG. 18, the buyback guarantee amount is shown with a thick line and the exchange amount according to the current price at each point of time is shown with a thin line. The thick line indicates the amount when the tokens are exchanged by using the buyback guarantee. The thin line indicates the amount when the tokens are exchanged at a general trading market without the use of the buyback guarantee.

When the terminal 2 displays the top screen, the server 1 calculates the exchange amounts of these at each point of time in the past, and outputs the graph 181. When calculating the buyback guarantee amount, for each point of time, the server 1 multiplies the quantity of tokens provided before that point of time by the current price at the point of time of provision, and accumulates the multiplication values to thereby calculate the buyback guarantee amount. Moreover, when calculating the exchange amount (second exchange amount) when the buyback guarantee is not used, for each point of time in the past, the server 1 multiplies the quantity of tokens held by the user at that point of time by the current price of the virtual currency at that point of time, thereby calculating the exchange amount. The server 1 calculates the exchange amounts of these for each point of time in the past (each date of the last one week in FIG. 18), and displays them as the graph 181 on the terminal 2. From the graph 181, the user can easily confirm that the buyback guarantee of the tokens is maintained through comparison with the market price.

FIG. 19 is an explanatory view showing an example of a provision history screen. The provision history screen is a display screen displaying the token provision history. When a specific menu operation is accepted from another screen, the terminal 2 shifts to the provision history screen of FIG. 19.

The provision history screen includes a provided token display column 191 and a provision history display column 192. The provided token display column 191 is a display column displaying the holding quantity of the tokens currently held by the user and the current price. "Under determination" indicates a condition where an approval from the member shop is awaited.

The provision history display column 192 is a display column displaying the quantity of tokens provided to the user, the current price at the point of time of provision and the like in association with the information on the purchase of the commodity or the like as the trigger of token provision. For each purchase information as the trigger of token provision, the terminal 2 lists, in the provision history display column 192, the quantity of tokens provided according to the purchase amount of the commodity or the like and the current price at the point of time of provision buyback at which is guaranteed.

Specifically, the terminal 2 displays the provision date ("fixed date" in FIG. 19), the quantity of provided tokens ("returned coin"), the current price at the point of time of provision ("exchange rate") and the like in association with the name of the member shop where the commodity or the like was purchased, the purchase date (date of use) and the like. "Status" indicates whether approval has been received or not. The user can easily grasp how much buyback guarantee is provided to tokens provided at which point of time, in the form of being associated with the history of purchase of the commodities or the like with reference to the provision history display column 192.

In the present modification which is common to Embodiments 1 to 3 except for the above-described screen display, flowcharts and other detailed descriptions are omitted.

It is to be noted that, as used herein and in the appended claims, the singular forms "a", "an", and "the" include plural referents unless the context clearly dictates otherwise.

It should be considered that the embodiments disclosed this time are illustrative in all aspects and are not limitative. The scope of the present invention is indicated not by the meaning described above but by the claims, and all changes that fall within the meaning equivalent to the claims and the scope are to be embraced.

What is claimed is:

1. An information processing method for providing flexibility in holding virtual currency by enabling exchanges and recommending member shops, the method comprising:
    obtaining, by a computer, (a) purchase information about a commodity or a service that was purchased by a user, wherein the purchase information is (i) obtained from an electronic commerce server or (ii) obtained based on a receipt corresponding to the commodity or service, (b) holding information of the user, wherein the holding information of the user comprises a holding quantity and a holding period of a virtual currency that is held by the user, (c) purchase history of the user, comprising a list of previous purchases by the user of commodities or services; (d) posting history of the user to a social networking service (SNS), and (e) individual information of the user comprising demographic information about the user;
    deciding, by the computer, on a first quantity of the virtual currency to be provided to the user, wherein the first quantity is based on the purchase information;
    determining, by the computer, whether providing the user with the first quantity of the virtual currency would cause an upper limit of the virtual currency issuance to be reached, and providing the user with a second quantity of a second virtual currency or a third quantity of a legal currency based on such determination, wherein the legal currency comprises government-issued currency;
    providing, by the computer, the user with the first quantity of the virtual currency, wherein providing the first quantity of the virtual currency to the user comprises registering a transaction in a database and broadcasting the transaction to a block chain network;
    setting, by the computer, (a) a maximum exchange period after a point in time when the first quantity of the virtual currency was provided to the user and during which an exchange request from the user may be accepted, and (b) a maximum exchange quantity of the virtual currency corresponding to an amount of the virtual currency the user may exchange, wherein the maximum exchange period and the maximum exchange quantity are set based on the holding information of the user;
    accepting, by the computer, an exchange request from the user to exchange a second quantity of the virtual currency for a substitute thing, wherein the substitute thing comprises a fourth quantity of the legal currency, a fifth quantity of electronic points or an article;
    making a determination, by the computer, (a) whether the exchange request was accepted within the maximum exchange period and (b) whether the second quantity of the virtual currency is equal to or less than the maximum exchange quantity of the virtual currency, and, based on said determination, performing, by the computer, an exchange of the second quantity of the virtual currency for the substitute thing;
    generating, by the computer, a machine learning-based estimation model, wherein the machine learning-based estimation model comprises a recurrent neural network trained based on the purchase history of the user, the posting history of the user to the social networking service (SNS) and the individual information of the user;
    estimating, by the computer, using the estimation model, a recommendation comprising a member shop or a priority order of member shops, wherein said estimating comprises:
        inputting the purchase history of the user, the purchase information, the posting history of the user to the social networking service (SNS) and the individual information of the user to a first plurality of nodes comprising an input layer of the recurrent neural network of the machine learning-based estimation model;
        transmitting, by the first plurality of nodes comprising the input layer, the data input to the input layer to a second plurality of nodes comprising an intermediate layer of the recurrent neural network of the machine learning-based estimation model;
        extracting, based on calculations performed by the second plurality of nodes comprising the intermediate layer, feature scores corresponding to aspects of the data transmitted to the intermediate layer;
        arranging, by a third plurality of nodes comprising an output layer of the recurrent neural network of the machine learning-based estimation model, the feature scores extracted by the intermediate layer; and estimating, by the third plurality of nodes comprising the output layer, the member shop or the priority order of member shops based on the arranged feature scores; and providing, by the computer, the user with the recommendation, wherein the recommendation includes the member shop or the priority order of member shops.

2. A non-transitory computer-readable storage medium for providing flexibility in holding virtual currency by enabling exchanges and recommending member shops having instructions stored thereon that, when executed on a processor, perform the method of:

obtaining (a) purchase information about a commodity or a service that was purchased by a user, wherein the purchase information is (i) obtained from an electronic commerce server or (ii) obtained based on a receipt corresponding to the commodity or service, (b) holding information of the user, wherein the holding information of the user comprises a holding quantity and a holding period of a virtual currency that is held by the user, (c) purchase history of the user, comprising a list of previous purchases by the user of commodities or services; (d) posting history of the user to a social networking service (SNS), and (e) individual information of the user comprising demographic information about the user;

deciding on a first quantity of the virtual currency to be provided to the user, wherein the first quantity is based on the purchase information;

determining whether providing the user with the first quantity of the virtual currency would cause an upper limit of the virtual currency issuance to be reached, and providing the user with a second quantity of a second virtual currency or a third quantity of a legal currency based on such determination, wherein the legal currency comprises government-issued currency;

providing the user with the first quantity of the virtual currency, wherein providing the first quantity of the virtual currency to the user comprises registering a transaction in a database and broadcasting the transaction to a block chain network;

setting (a) a maximum exchange period after a point in time when the first quantity of the virtual currency was provided to the user and during which an exchange request from the user may be accepted, and (b) a maximum exchange quantity of the virtual currency corresponding to an amount of the virtual currency the user may exchange, wherein the maximum exchange period and the maximum exchange quantity are set based on the holding information of the user;

accepting, from the user, an exchange request to exchange a second quantity of the virtual currency for a substitute thing, wherein the substitute thing comprises a fourth quantity of the legal currency, a fifth quantity of electronic points or an article;

making a determination, (a) whether the exchange request was accepted within the maximum exchange period and (b) whether the second quantity of the virtual currency is equal to or less than the maximum exchange quantity of the virtual currency, and, based on said determination, performing an exchange of the second quantity of the virtual currency for the substitute thing;

generating a machine learning-based estimation model, wherein the machine learning-based estimation model comprises a recurrent neural network trained based on the user's purchase history of the user, the posting history of the user to the social networking service (SNS) and the individual information of the user;

estimating using the estimation model a recommendation comprising a member shop or a priority order of member shops, wherein said estimating comprises:

inputting the purchase history of the user, including the purchase information, the posting history of the user to the social networking service (SNS) and the individual information of the user to a first plurality of nodes comprising an input layer of the recurrent neural network of the machine learning-based estimation model;

transmitting, by the first plurality of nodes comprising the input layer, the data input to the input layer to a second plurality of nodes comprising an intermediate layer of the recurrent neural network of the machine learning-based estimation model;

extracting, based on calculations performed by the second plurality of nodes comprising the intermediate layer, feature scores corresponding to aspects of the data transmitted to the intermediate layer;

arranging, by a third plurality of nodes comprising an output layer of the recurrent neural network of the machine learning-based estimation model, the feature scores extracted by the intermediate layer; and estimating, by the third plurality of nodes comprising the output layer, the member shop or the priority order of member shops based on the arranged feature scores; and providing the user with the recommendation, wherein the recommendation includes the member shop or the priority order of member shops.

* * * * *